(12) United States Patent
Singh et al.

(10) Patent No.: US 7,752,853 B2
(45) Date of Patent: Jul. 13, 2010

(54) MONITORING REFRIGERANT IN A REFRIGERATION SYSTEM

(75) Inventors: Abtar Singh, Kennesaw, GA (US);
Thomas J. Mathews, Fayette, ME (US);
Stephen T. Woodworth, Woodstock, GA (US); Pawan K. Churiwal, Atlanta, GA (US); James R. Mitchell, Smyrna, GA (US); Ozgur Y. Gurkan, Kennesaw, GA (US)

(73) Assignee: Emerson Retail Services, Inc., Kennesaw, GA (US)

( * ) Notice: Subject to any disclaimer, the term of this patent is extended or adjusted under 35 U.S.C. 154(b) by 703 days.

(21) Appl. No.: 11/256,637

(22) Filed: Oct. 21, 2005

(65) Prior Publication Data

US 2007/0089434 A1 Apr. 26, 2007

(51) Int. Cl.
*G01K 13/00* (2006.01)
*F25B 49/00* (2006.01)

(52) U.S. Cl. .......................... 62/129; 62/125
(58) Field of Classification Search ................... 62/125, 62/126, 127, 129, 149, 282, 324.1
See application file for complete search history.

(56) References Cited

U.S. PATENT DOCUMENTS

| | | | |
|---|---|---|---|
| 2,296,822 A | 9/1942 | Wolfert |
| 3,232,519 A | 2/1966 | Long |
| 3,513,662 A | 5/1970 | Golber |
| 3,585,451 A | 6/1971 | Day |
| 3,653,783 A | 4/1972 | Sauder |
| 3,735,377 A | 5/1973 | Kaufman |
| 3,767,328 A | 10/1973 | Ladusaw |
| 3,783,681 A | 1/1974 | Hirt et al. |
| 3,924,972 A | 12/1975 | Szymaszek |
| 4,060,716 A | 11/1977 | Pekrul et al. |
| 4,090,248 A | 5/1978 | Swanson et al. |
| 4,102,150 A | 7/1978 | Kountz |
| 4,102,394 A | 7/1978 | Botts |
| 4,112,703 A | 9/1978 | Kountz |
| 4,132,086 A | 1/1979 | Kountz |
| 4,151,725 A | 5/1979 | Kountz et al. |
| 4,281,358 A | 7/1981 | Plouffe et al. |
| 4,325,223 A | 4/1982 | Cantley |

(Continued)

FOREIGN PATENT DOCUMENTS

CH 173493 11/1934

(Continued)

OTHER PUBLICATIONS

European Search Report for EP 01 30 1752; Mar. 26, 2002; 4 Pages.

(Continued)

*Primary Examiner*—Chen-Wen Jiang
(74) *Attorney, Agent, or Firm*—Harness, Dickey & Pierce, P.L.C.

(57) ABSTRACT

A method for monitoring refrigerant in a refrigeration system includes sensing, a refrigerant pressure of a refrigeration system, averaging the refrigerant pressure over a time period, determining an expected pressure based on said time period, comparing the average to the expected pressure, and determining a system condition based on said comparison. The method may be executed by a controller or stored in a computer-readable medium.

32 Claims, 32 Drawing Sheets

U.S. PATENT DOCUMENTS

| | | |
|---|---|---|
| 4,345,162 A | 8/1982 | Hammer et al. |
| 4,372,119 A | 2/1983 | Gillbrand et al. |
| 4,384,462 A | 5/1983 | Overman et al. |
| 4,390,321 A | 6/1983 | Langlois et al. |
| 4,390,922 A | 6/1983 | Pelliccia |
| 4,399,548 A | 8/1983 | Castleberry |
| 4,420,947 A | 12/1983 | Yoshino |
| 4,425,010 A | 1/1984 | Bryant et al. |
| 4,429,578 A | 2/1984 | Darrel et al. |
| 4,434,390 A | 2/1984 | Elms |
| 4,463,576 A | 8/1984 | Burnett et al. |
| 4,467,613 A | 8/1984 | Behr et al. |
| 4,470,092 A | 9/1984 | Lombardi |
| 4,479,389 A | 10/1984 | Anderson, III et al. |
| 4,494,383 A | 1/1985 | Nagatomo et al. |
| 4,497,031 A | 1/1985 | Froehling et al. |
| 4,502,842 A | 3/1985 | Currier et al. |
| 4,502,843 A | 3/1985 | Martin |
| 4,505,125 A | 3/1985 | Baglione |
| 4,506,518 A | 3/1985 | Yoshikawa et al. |
| 4,510,576 A | 4/1985 | MacArthur et al. |
| 4,520,674 A | 6/1985 | Canada et al. |
| 4,540,040 A | 9/1985 | Fukumoto et al. |
| 4,555,910 A | 12/1985 | Sturges |
| 4,563,878 A | 1/1986 | Baglione |
| 4,575,318 A | 3/1986 | Blain |
| 4,580,947 A | 4/1986 | Shibata et al. |
| 4,604,036 A | 8/1986 | Sutou et al. |
| 4,611,470 A | 9/1986 | Enstrom |
| 4,614,089 A | 9/1986 | Dorsey |
| 4,630,670 A | 12/1986 | Wellman et al. |
| 4,653,280 A | 3/1987 | Hansen et al. |
| 4,655,688 A | 4/1987 | Bohn et al. |
| 4,660,386 A | 4/1987 | Hansen et al. |
| 4,715,792 A | 12/1987 | Nishizawa et al. |
| 4,755,957 A | 7/1988 | White et al. |
| 4,768,346 A | 9/1988 | Mathur |
| 4,787,213 A | 11/1988 | Gras et al. |
| 4,796,466 A * | 1/1989 | Farmer ................... 73/40.5 R |
| 4,798,055 A | 1/1989 | Murray et al. |
| 4,831,560 A | 5/1989 | Zaleski |
| 4,831,832 A | 5/1989 | Alsenz |
| 4,838,037 A | 6/1989 | Wood |
| 4,856,286 A | 8/1989 | Sulfstede et al. |
| 4,877,382 A | 10/1989 | Caillat et al. |
| 4,881,184 A | 11/1989 | Abegg, III et al. |
| 4,882,747 A | 11/1989 | Williams |
| 4,884,412 A | 12/1989 | Sellers et al. |
| 4,885,707 A | 12/1989 | Nichol et al. |
| 4,904,993 A | 2/1990 | Sato |
| 4,909,076 A | 3/1990 | Busch et al. |
| 4,913,625 A | 4/1990 | Gerlowski |
| 4,928,750 A | 5/1990 | Nurczyk |
| 4,949,550 A | 8/1990 | Hanson |
| 4,964,060 A | 10/1990 | Hartsog |
| 4,974,427 A | 12/1990 | Diab |
| 4,985,857 A | 1/1991 | Bajpai et al. |
| 5,009,074 A | 4/1991 | Goubeaux et al. |
| 5,018,357 A | 5/1991 | Livingstone et al. |
| 5,022,234 A | 6/1991 | Goubeaux et al. |
| 5,051,720 A | 9/1991 | Kittirutsunetorn |
| 5,056,036 A | 10/1991 | Van Bork |
| 5,058,388 A | 10/1991 | Shaw et al. |
| 5,070,468 A | 12/1991 | Niinomi et al. |
| 5,071,065 A | 12/1991 | Aalto et al. |
| 5,073,862 A | 12/1991 | Carlson |
| 5,076,067 A | 12/1991 | Prenger et al. |
| 5,086,385 A | 2/1992 | Launey et al. |
| 5,088,297 A | 2/1992 | Maruyama et al. |
| 5,099,654 A | 3/1992 | Baruschke et al. |
| 5,109,222 A | 4/1992 | Welty |
| 5,109,700 A | 5/1992 | Hicho |
| 5,115,406 A | 5/1992 | Zatezalo et al. |
| 5,119,466 A | 6/1992 | Suzuki |
| 5,131,237 A | 7/1992 | Valbjorn |
| 5,156,539 A | 10/1992 | Anderson et al. |
| 5,181,389 A | 1/1993 | Hanson et al. |
| 5,203,178 A | 4/1993 | Shyu |
| 5,203,179 A | 4/1993 | Powell |
| 5,209,076 A | 5/1993 | Kauffman et al. |
| 5,209,400 A | 5/1993 | Winslow et al. |
| 5,224,835 A | 7/1993 | Oltman |
| 5,226,472 A | 7/1993 | Benevelli et al. |
| 5,243,827 A | 9/1993 | Hagita et al. |
| 5,265,434 A | 11/1993 | Alsenz |
| 5,279,458 A | 1/1994 | DeWolf et al. |
| 5,282,728 A | 2/1994 | Swain |
| 5,284,026 A | 2/1994 | Powell |
| 5,299,504 A | 4/1994 | Abele |
| 5,303,560 A | 4/1994 | Hanson et al. |
| 5,311,451 A | 5/1994 | Barrett |
| 5,316,448 A | 5/1994 | Ziegler et al. |
| 5,335,507 A | 8/1994 | Powell |
| 5,362,206 A | 11/1994 | Westerman et al. |
| 5,381,692 A | 1/1995 | Winslow et al. |
| 5,415,008 A | 5/1995 | Bessler |
| 5,416,781 A | 5/1995 | Ruiz |
| 5,423,190 A | 6/1995 | Friedland |
| 5,423,192 A | 6/1995 | Young et al. |
| 5,426,952 A | 6/1995 | Bessler |
| 5,431,026 A | 7/1995 | Jaster |
| 5,435,145 A | 7/1995 | Jaster |
| 5,440,890 A | 8/1995 | Bahel et al. |
| 5,440,891 A | 8/1995 | Hindmon, Jr. et al. |
| 5,440,895 A | 8/1995 | Bahel et al. |
| 5,446,677 A | 8/1995 | Jensen et al. |
| 5,450,359 A | 9/1995 | Sharma et al. |
| 5,452,291 A | 9/1995 | Eisenhandler et al. |
| 5,454,229 A | 10/1995 | Hanson et al. |
| 5,457,965 A * | 10/1995 | Blair et al. .................... 62/129 |
| 5,460,006 A | 10/1995 | Torimitsu |
| 5,467,264 A | 11/1995 | Rauch et al. |
| 5,481,481 A | 1/1996 | Frey et al. |
| 5,483,141 A | 1/1996 | Uesugi |
| 5,509,786 A | 4/1996 | Mizutani et al. |
| 5,511,387 A | 4/1996 | Tinsler |
| 5,519,301 A | 5/1996 | Yoshida et al. |
| 5,528,908 A | 6/1996 | Bahel et al. |
| 5,546,756 A | 8/1996 | Ali |
| 5,546,757 A | 8/1996 | Whipple, III |
| 5,548,966 A | 8/1996 | Tinsler |
| 5,555,195 A | 9/1996 | Jensen et al. |
| 5,570,085 A | 10/1996 | Bertsch |
| 5,570,258 A | 10/1996 | Manning |
| 5,572,643 A | 11/1996 | Judson |
| 5,596,507 A | 1/1997 | Jones et al. |
| 5,602,749 A * | 2/1997 | Vosburgh .................... 700/174 |
| 5,602,757 A | 2/1997 | Haseley et al. |
| 5,610,339 A | 3/1997 | Haseley et al. |
| 5,630,325 A | 5/1997 | Bahel et al. |
| 5,641,270 A | 6/1997 | Sgourakes et al. |
| 5,655,379 A | 8/1997 | Jaster et al. |
| 5,655,380 A | 8/1997 | Calton |
| 5,689,963 A * | 11/1997 | Bahel et al. .................... 62/129 |
| 5,694,010 A | 12/1997 | Oomura et al. |
| 5,707,210 A | 1/1998 | Ramsey et al. |
| 5,713,724 A | 2/1998 | Centers et al. |
| 5,715,704 A | 2/1998 | Cholkeri et al. |
| 5,741,120 A | 4/1998 | Bass et al. |
| 5,743,109 A | 4/1998 | Schulak |
| 5,752,385 A | 5/1998 | Nelson |
| 5,875,430 A | 2/1999 | Koether |
| 5,875,638 A | 3/1999 | Tinsler |
| 5,900,801 A | 5/1999 | Heagle et al. |

| | | | |
|---|---|---|---|
| 5,904,049 A | 5/1999 | Jaster et al. |
| 5,924,295 A | 7/1999 | Park |
| 5,939,974 A | 8/1999 | Heagle et al. |
| 5,946,922 A | 9/1999 | Viard et al. |
| 5,947,693 A | 9/1999 | Yang |
| 5,953,490 A | 9/1999 | Wiklund et al. |
| 5,956,658 A | 9/1999 | McMahon |
| 5,975,854 A | 11/1999 | Culp, III et al. |
| 5,984,645 A | 11/1999 | Cummings |
| 5,986,571 A | 11/1999 | Flick |
| 6,006,171 A | 12/1999 | Vines et al. |
| 6,035,661 A | 3/2000 | Sunaga et al. |
| 6,038,871 A | 3/2000 | Gutierrez et al. |
| 6,047,557 A | 4/2000 | Pham et al. |
| 6,081,750 A | 6/2000 | Hoffberg et al. |
| 6,088,659 A | 7/2000 | Kelley et al. |
| 6,098,893 A | 8/2000 | Berglund et al. |
| 6,125,642 A | 10/2000 | Seener et al. |
| 6,129,527 A | 10/2000 | Donahoe et al. |
| 6,153,993 A | 11/2000 | Oomura et al. |
| 6,176,686 B1 | 1/2001 | Wallis et al. |
| 6,178,362 B1 | 1/2001 | Woolard et al. |
| 6,179,214 B1 | 1/2001 | Key et al. |
| 6,191,545 B1 | 2/2001 | Kawabata et al. |
| 6,213,731 B1 | 4/2001 | Doepker et al. |
| 6,215,405 B1 | 4/2001 | Handley et al. |
| 6,240,733 B1 | 6/2001 | Brandon et al. |
| 6,240,736 B1 | 6/2001 | Fujita et al. |
| 6,244,061 B1 | 6/2001 | Takagi et al. |
| 6,266,968 B1 | 7/2001 | Redlich |
| 6,272,868 B1 | 8/2001 | Grabon et al. |
| 6,276,901 B1 | 8/2001 | Farr et al. |
| 6,290,043 B1 | 9/2001 | Ginder et al. |
| 6,293,114 B1 * | 9/2001 | Kamemoto .............. 62/129 |
| 6,302,654 B1 | 10/2001 | Millet et al. |
| 6,324,854 B1 | 12/2001 | Jayanth |
| 6,349,883 B1 | 2/2002 | Simmons et al. |
| 6,378,315 B1 | 4/2002 | Gelber et al. |
| 6,393,848 B2 | 5/2002 | Roh et al. |
| 6,397,606 B1 | 6/2002 | Roh et al. |
| 6,453,687 B2 | 9/2002 | Sharood et al. |
| 6,466,971 B1 | 10/2002 | Humpleman et al. |
| 6,471,486 B1 | 10/2002 | Centers et al. |
| 6,487,457 B1 | 11/2002 | Hull et al. |
| 6,502,409 B1 | 1/2003 | Gatling et al. |
| 6,526,766 B1 | 3/2003 | Hiraoka et al. |
| 6,553,774 B1 | 4/2003 | Ishio et al. |
| 6,571,280 B1 | 5/2003 | Hubacher |
| 6,601,397 B2 | 8/2003 | Pham et al. |
| 6,609,078 B2 | 8/2003 | Starling et al. |
| 6,636,893 B1 | 10/2003 | Fong |
| 6,662,584 B1 | 12/2003 | Whiteside |
| 6,675,591 B2 | 1/2004 | Singh et al. |
| 6,708,508 B2 * | 3/2004 | Demuth et al. ........... 62/129 |
| 6,892,546 B2 | 5/2005 | Singh et al. |
| 6,990,821 B2 | 1/2006 | Singh et al. |
| 6,996,441 B1 | 2/2006 | Tobias |
| 6,997,390 B2 | 2/2006 | Alles |
| 7,003,378 B2 | 2/2006 | Poth |
| 7,024,870 B2 | 4/2006 | Singh et al. |
| 7,043,339 B2 | 5/2006 | Maeda et al. |
| 7,091,847 B2 | 8/2006 | Capowski et al. |
| 7,114,343 B2 | 10/2006 | Kates |
| 7,290,398 B2 | 11/2007 | Wallace et al. |
| 7,328,192 B1 | 2/2008 | Stengard et al. |
| 7,330,886 B2 | 2/2008 | Childers et al. |
| 7,337,191 B2 | 2/2008 | Haeberle et al. |
| 7,490,477 B2 | 2/2009 | Singh et al. |
| 7,555,364 B2 | 6/2009 | Poth et al. |
| 2001/0025349 A1 | 9/2001 | Sharood et al. |
| 2001/0054291 A1 | 12/2001 | Roh et al. |
| 2002/0000092 A1 | 1/2002 | Sharood et al. |
| 2002/0020175 A1 | 2/2002 | Street et al. |
| 2002/0029575 A1 | 3/2002 | Okamoto |
| 2002/0082924 A1 | 6/2002 | Koether |
| 2002/0118106 A1 | 8/2002 | Brenn |
| 2002/0161545 A1 | 10/2002 | Starling et al. |
| 2002/0163436 A1 | 11/2002 | Singh et al. |
| 2002/0173929 A1 | 11/2002 | Seigel |
| 2004/0159113 A1 | 8/2004 | Singh et al. |
| 2004/0239266 A1 | 12/2004 | Lee et al. |
| 2004/0261431 A1 | 12/2004 | Singh et al. |
| 2005/0043923 A1 * | 2/2005 | Forster et al. ............... 702/184 |
| 2005/0086341 A1 | 4/2005 | Enga et al. |
| 2005/0198063 A1 | 9/2005 | Thomas et al. |
| 2005/0204756 A1 | 9/2005 | Dobmeier et al. |
| 2006/0032245 A1 | 2/2006 | Kates |
| 2006/0074917 A1 | 4/2006 | Chand et al. |
| 2007/0006124 A1 | 1/2007 | Ahmed et al. |

FOREIGN PATENT DOCUMENTS

| | | |
|---|---|---|
| DE | 842 351 | 6/1952 |
| DE | 764 179 | 4/1953 |
| DE | 1144461 | 2/1963 |
| DE | 1403516 | 10/1968 |
| DE | 1403467 | 10/1969 |
| DE | 3133502 | 6/1982 |
| DE | 3422398 | 12/1985 |
| EP | 0 085 246 | 8/1983 |
| EP | 0 254 253 | 1/1988 |
| EP | 0 351 833 | 7/1989 |
| EP | 0 410 330 | 1/1991 |
| EP | 0419857 | 4/1991 |
| EP | 0 453 301 A1 | 10/1991 |
| EP | 0 479 421 | 8/1992 |
| EP | 0 557 023 | 8/1993 |
| EP | 0 579 374 A1 | 1/1994 |
| EP | 0 660 213 A2 | 6/1995 |
| EP | 0 747 598 A2 | 12/1996 |
| EP | 0 877 462 A2 | 11/1998 |
| EP | 0 982 497 A1 | 3/2000 |
| EP | 1008816 A2 * | 6/2000 |
| EP | 1 087 142 | 3/2001 |
| EP | 1 138 949 | 10/2001 |
| EP | 1 139 037 | 10/2001 |
| EP | 1187021 A2 | 3/2002 |
| EP | 1 209 427 A1 | 5/2002 |
| EP | 1 241 417 A1 | 9/2002 |
| FR | 2582430 | 11/1986 |
| FR | 2589561 | 7/1987 |
| FR | 2628558 | 9/1989 |
| FR | 2660739 | 10/1991 |
| GB | 2 062 919 A | 5/1981 |
| GB | 2 064 818 | 6/1981 |
| GB | 2 116 635 | 9/1983 |
| JP | 56-10639 | 3/1981 |
| JP | 59-145392 | 8/1984 |
| JP | 61-046485 | 3/1986 |
| JP | 62-116844 | 5/1987 |
| JP | 02110242 | 4/1990 |
| JP | 02294580 | 12/1990 |
| JP | O4080578 | 3/1992 |
| JP | 06058273 | 3/1994 |
| JP | 08-284842 | 10/1996 |
| JP | 2005241089 | 9/2005 |
| JP | 2005345096 | 12/2005 |
| WO | WO 8601262 | 2/1986 |
| WO | WO 8703988 | 7/1987 |
| WO | WO 8802527 | 4/1988 |
| WO | WO 9718636 | 5/1997 |
| WO | WO 97/48161 | 12/1997 |
| WO | WO 9917066 | 4/1999 |
| WO | WO02/14968 | 2/2002 |
| WO | WO02/090840 | 11/2002 |
| WO | WO02/090913 | 11/2002 |

| | | |
|---|---|---|
| WO | WO2005/022049 | 3/2005 |
| WO | WO2006/091521 | 8/2006 |

OTHER PUBLICATIONS

European Search Report for EP 82306809.3; Apr. 28, 1983; 1 Page.
European Search Report for EP 91 30 3518; Jul. 22, 1991; 1 Page.
European Search Report for EP 01 30 7547; Feb. 20, 2002; 1 Page.
European Search Report for EP 96 30 4219; Dec. 1, 1998; 2 Pages.
European Search Report for EP 99 30 6052; Dec. 28, 1999; 3 Pages.
European Search Report for EP 94 30 3484; Apr. 3, 1997; 1 Page.
European Search Report for EP 93 30 4470; Oct. 26, 1993; 1 Page.
European Search Report for EP 02 25 0266; May 17, 2002; 3 Pages.
European Search Report for EP 98 30 3525; May 28, 1999; 2 Pages.
International Search Report; International Application No. PCT/IB96/01435; May 23, 1997; 1 Page.
International Search Report; International Application No. PCT/US98/18710; Jan. 26, 1999; 1 Page.
International Search Report, International Application No. PCT/US2006/040964, dated Feb. 15, 2007, 2 Pages.
European Search Report for EP 02 73 1544, Jun. 18, 2004, 2 Pages.
European Search Report for EP 02 72 9050, Jun. 17, 2004, 2 Pages.
International Search Report, International Application No. PCT/US02/13456, dated Aug. 22, 2002, 2 Pages.
International Search Report, International Application No. PCT/US2004/027654, dated Aug. 25, 2004, 4 Pages.
Pin Carmen, Baranyi Jozsef, Predictive Models as Means to Quantify the Interactions of Spoilage Organisms, International Journal of Food Microbiology, ol. 41, No. 1, 1998, pp. 59-72, XP-002285119.
International Search Report, Intl. App. No. PCT/US 06/05917, dated Sep. 26, 2007.
Written Opinion of the International Searching Authority, Int'l. App. No. PCT/US 06/05917, dated Sep. 26, 2007.
Torcellini, P., et al., "Evaluation of the Energy Performance and Design Process of the Thermal Test Facility at the National Renewable Energy Laboratory", dated Feb. 2005.
Supplementary European Search Report regarding Application No. EP06735535, dated Nov. 23, 2009.
International Search Report for PCT/US02/13459; ISA/US; dated mailed Sep. 19, 2002, 4 pages.

* cited by examiner

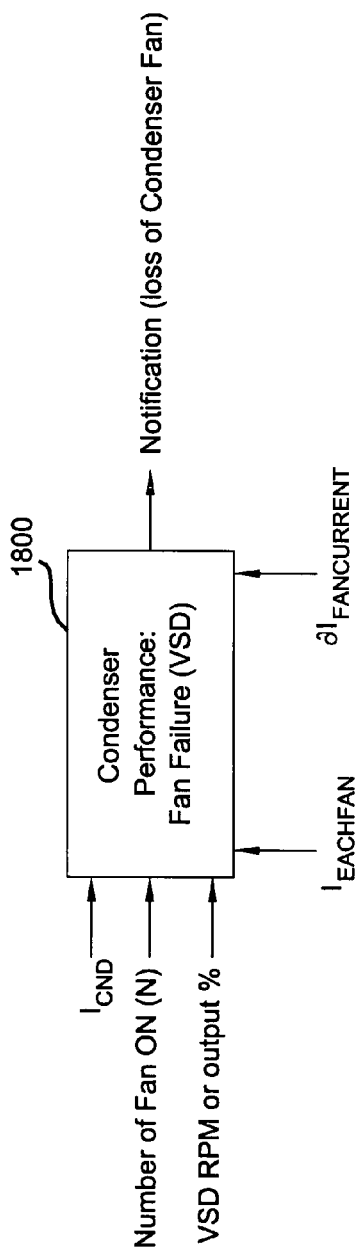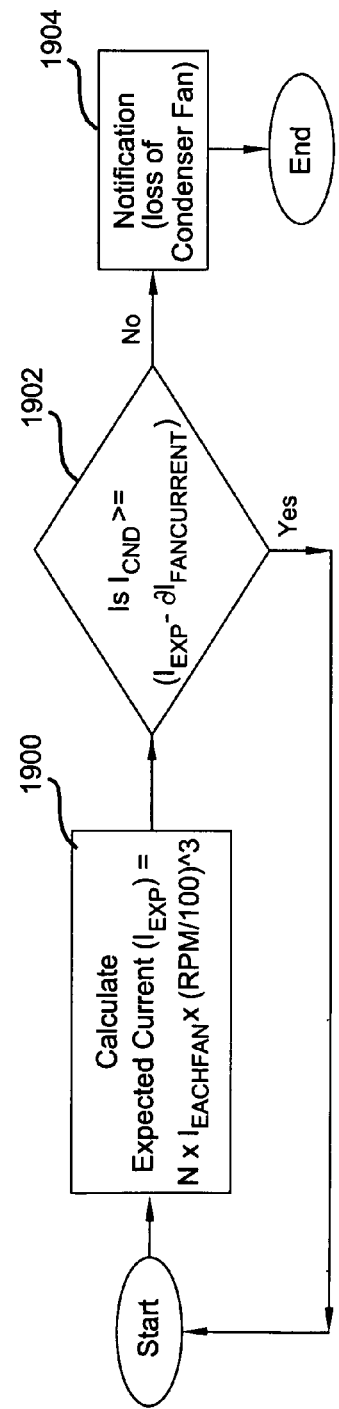

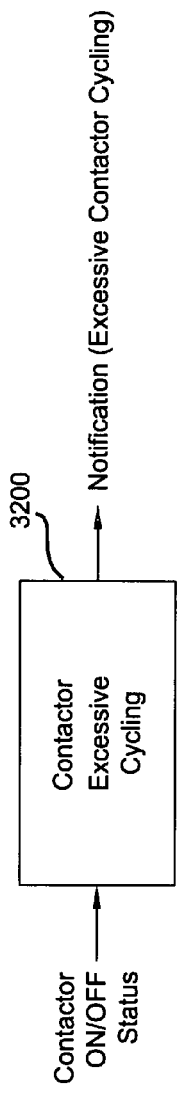
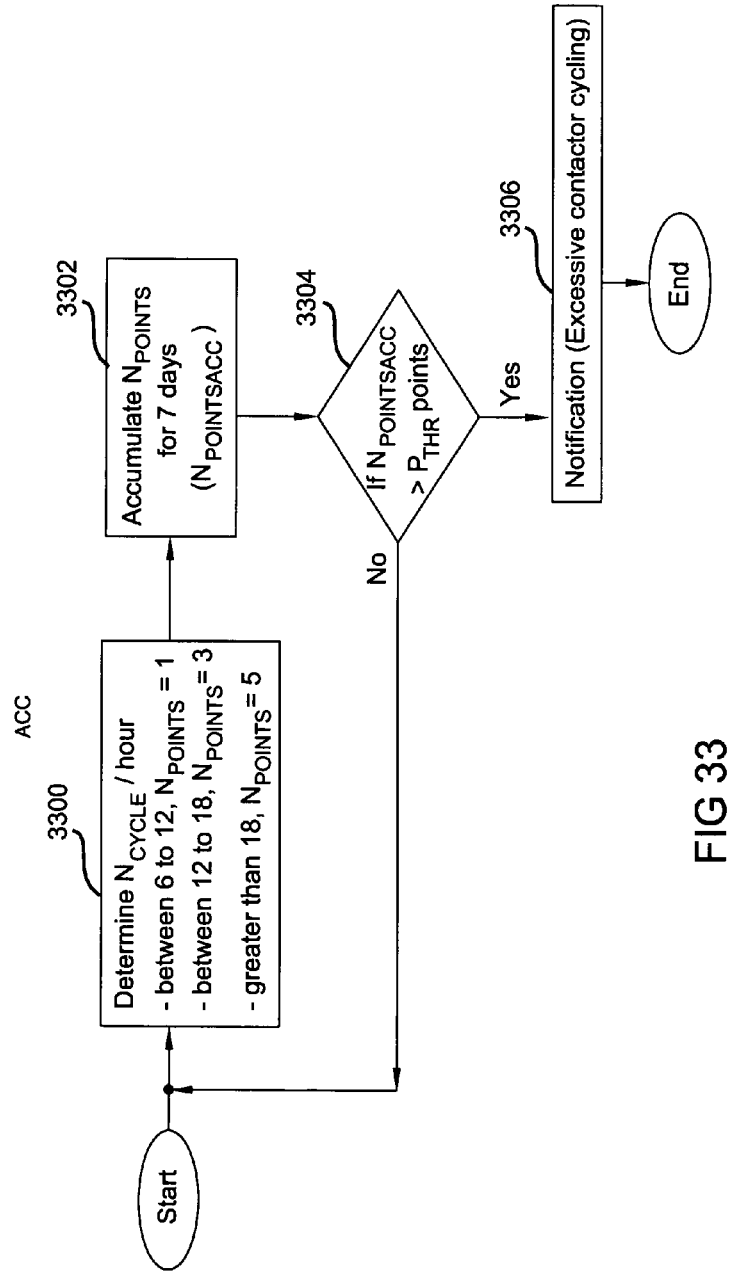
FIG 32
FIG 33

# MONITORING REFRIGERANT IN A REFRIGERATION SYSTEM

FIELD

The present teachings relate to refrigeration systems and, more particularly, to monitoring refrigerant in a refrigeration system.

BACKGROUND

Produced food travels from processing plants to retailers, where the food product remains on display case shelves for extended periods of time. In general, the display case shelves are part of a refrigeration system for storing the food product. In the interest of efficiency, retailers attempt to maximize the shelf-life of the stored food product while maintaining awareness of food product quality and safety issues.

The refrigeration system plays a key role in controlling the quality and safety of the food product. Thus, any breakdown in the refrigeration system or variation in performance of the refrigeration system can cause food quality and safety issues. Thus, it is important for the retailer to monitor and maintain the equipment of the refrigeration system to ensure its operation at expected levels.

Refrigeration systems generally require a significant amount of energy to operate. The energy requirements are thus a significant cost to food product retailers, especially when compounding the energy uses across multiple retail locations. As a result, it is in the best interest of food retailers to closely monitor the performance of the refrigeration systems to maximize their efficiency, thereby reducing operational costs.

Monitoring refrigeration system performance, maintenance and energy consumption are tedious and time-consuming operations and are undesirable for retailers to perform independently. Generally speaking, retailers lack the expertise to accurately analyze time and temperature data and relate that data to food product quality and safety, as well as the expertise to monitor the refrigeration system for performance, maintenance and efficiency. Further, a typical food retailer includes a plurality of retail locations spanning a large area. Monitoring each of the retail locations on an individual basis is inefficient and often results in redundancies.

SUMMARY

A method for monitoring refrigerant in a refrigeration system is provided. The method comprises sensing a refrigerant pressure of a refrigeration system, averaging the refrigerant pressure over a time period, determining an expected pressure based on the time period, comparing the average to the expected pressure, and determining a system condition based on the comparison.

In other features, a controller executing the method is provided. In still other features, a computer-readable medium having computer-executable instructions for performing the method is provided.

Further areas of applicability of the present teachings will become apparent from the detailed description provided hereinafter. It should be understood that the detailed description and specific examples are intended for purposes of illustration only and are not intended to limit the scope of the teachings.

BRIEF DESCRIPTION OF THE DRAWINGS

The present teachings will become more fully understood from the detailed description and the accompanying drawings, wherein:

FIG. 18 is a block diagram illustrating configuration and output parameters of a condenser performance monitor for a variable sped drive (VSD) condenser;

FIG. 19 is a flowchart illustrating a condenser performance algorithm for the VSD condenser;

FIG. 32 is a block diagram illustrating inputs and outputs of a contactor excessive cycling algorithm;

FIG. 33 is a flowchart illustrating the contactor excessive cycling algorithm;

DETAILED DESCRIPTION

The following description is merely exemplary in nature and is in no way intended to limit the present teachings, applications, or uses. As used herein, computer-readable medium refers to any medium capable of storing data that may be received by a computer. Computer-readable medium may include, but is not limited to, a CD-ROM, a floppy disk, a magnetic tape, other magnetic medium capable of storing data, memory, RAM, ROM, PROM, EPROM, EEPROM, flash memory, punch cards, dip switches, or any other medium capable of storing data for a computer.

Figure 1:
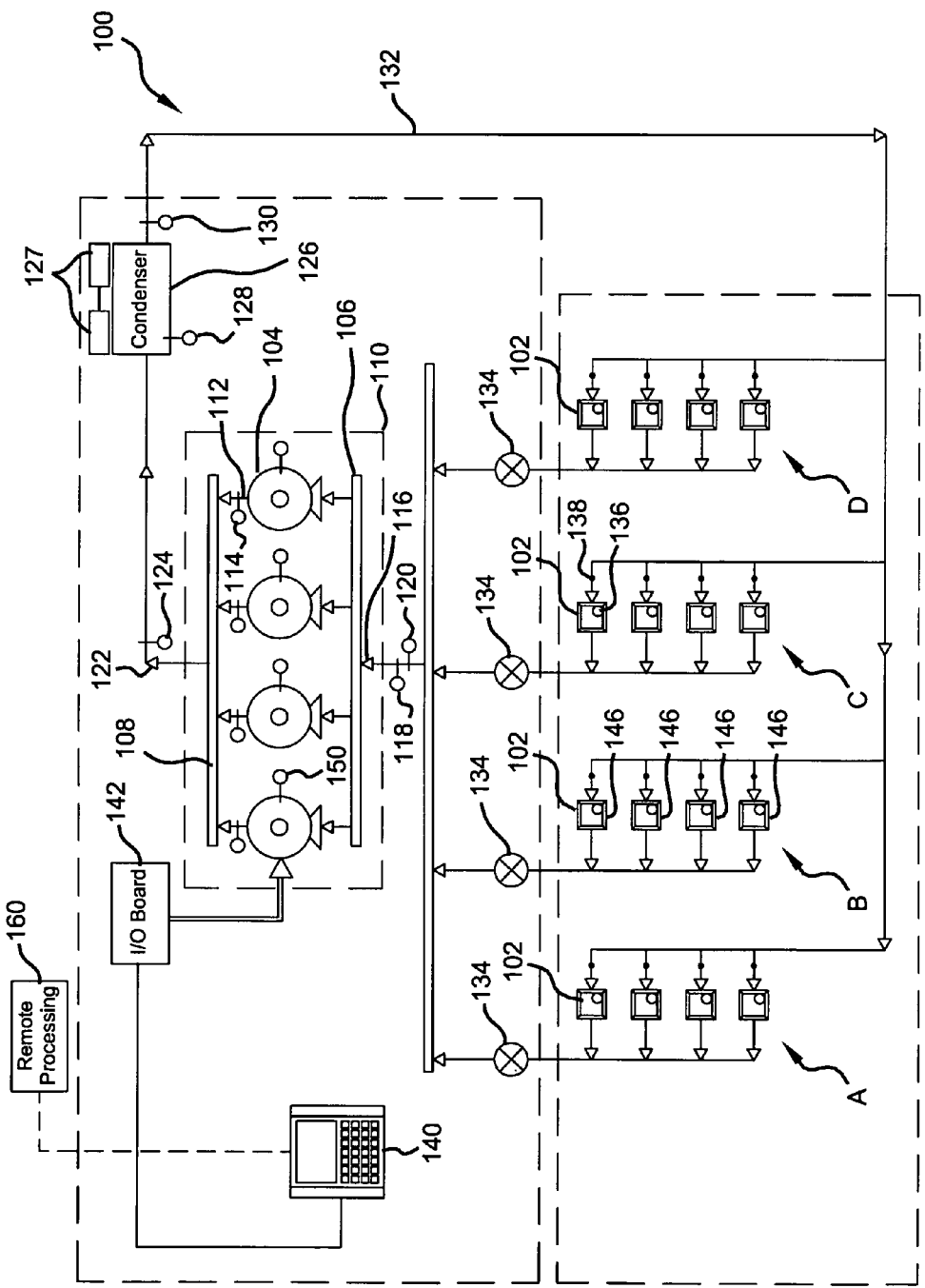
FIG. 1 is a schematic illustration of an exemplary refrigeration system.

With reference to FIG. 1, an exemplary refrigeration system 100 includes a plurality of refrigerated food storage cases 102. The refrigeration system 100 includes a plurality of compressors 104 piped together with a common suction manifold 106 and a discharge header 108 all positioned within a compressor rack 110. A discharge output 112 of each compressor 102 includes a respective temperature sensor 114. An input 116 to the suction manifold 106 includes both a pressure sensor 118 and a temperature sensor 120. Further, a discharge outlet 122 of the discharge header 108 includes an associated pressure sensor 124. As described in further detail hereinbelow, the various sensors are implemented for evaluating maintenance requirements.

The compressor rack 110 compresses refrigerant vapor that is delivered to a condenser 126 where the refrigerant vapor is liquefied at high pressure. Condenser fans 127 are associated with the condenser 126 to enable improved heat transfer from the condenser 126. The condenser 126 includes an associated ambient temperature sensor 128 and an outlet pressure sensor 130. This high-pressure liquid refrigerant is delivered to the plurality of refrigeration cases 102 by way of piping 132. Each refrigeration case 102 is arranged in separate circuits consisting of a plurality of refrigeration cases 102 that operate within a certain temperature range. FIG. 1 illustrates four (4) circuits labeled circuit A, circuit B, circuit C and circuit D. Each circuit is shown consisting of four (4) refrigeration cases 102. However, those skilled in the art will recognize that any number of circuits, as well as any number of refrigeration cases 102 may be employed within a circuit. As indicated, each circuit will generally operate within a certain temperature range. For example, circuit A may be for frozen food, circuit B may be for dairy, circuit C may be for meat, etc.

Because the temperature requirement is different for each circuit, each circuit includes a pressure regulator 134 that acts to control the evaporator pressure and, hence, the temperature of the refrigerated space in the refrigeration cases 102. The pressure regulators 134 can be electronically or mechanically controlled. Each refrigeration case 102 also includes its own evaporator 136 and its own expansion valve 138 that may be either a mechanical or an electronic valve for controlling the superheat of the refrigerant. In this regard, refrigerant is delivered by piping to the evaporator 136 in each refrigeration case 102.

The refrigerant passes through the expansion valve 138 where a pressure drop causes the high pressure liquid refrigerant to achieve a lower pressure combination of liquid and vapor. As hot air from the refrigeration case 102 moves across the evaporator 136, the low pressure liquid turns into gas. This low pressure gas is delivered to the pressure regulator 134 associated with that particular circuit. At the pressure regulator 134, the pressure is dropped as the gas returns to the compressor rack 110. At the compressor rack 110, the low pressure gas is again compressed to a high pressure gas, which is delivered to the condenser 126, which creates a high pressure liquid to supply to the expansion valve 138 and start the refrigeration cycle again.

A main refrigeration controller 140 is used and configured or programmed to control the operation of the refrigeration system 100. The refrigeration controller 140 is preferably an Einstein Area Controller offered by CPC, Inc. of Atlanta, Ga., or any other type of programmable controller that may be programmed, as discussed herein. The refrigeration controller 140 controls the bank of compressors 104 in the compressor rack 110, via an input/output module 142. The input/output module 142 has relay switches to turn the compressors 104 on an off to provide the desired suction pressure.

A separate case controller (not shown), such as a CC-100 case controller, also offered by CPC, Inc. of Atlanta, Ga. may be used to control the superheat of the refrigerant to each refrigeration case 102, via an electronic expansion valve in each refrigeration case 102 by way of a communication network or bus. Alternatively, a mechanical expansion valve may be used in place of the separate case controller. Should separate case controllers be utilized, the main refrigeration controller 140 may be used to configure each separate case controller, also via the communication bus. The communication bus may either be a RS-485 communication bus or a LonWorks Echelon bus that enables the main refrigeration controller 140 and the separate case controllers to receive information from each refrigeration case 102.

Each refrigeration case 102 may have a temperature sensor 146 associated therewith, as shown for circuit B. The temperature sensor 146 can be electronically or wirelessly connected to the controller 140 or the expansion valve for the refrigeration case 102. Each refrigeration case 102 in the circuit B may have a separate temperature sensor 146 to take average/min/max temperatures or a single temperature sensor 146 in one refrigeration case 102 within circuit B may be used to control each refrigeration case 102 in circuit B because all of the refrigeration cases 102 in a given circuit operate at substantially the same temperature range. These temperature inputs are preferably provided to the analog input board 142, which returns the information to the main refrigeration controller 140 via the communication bus.

Additionally, further sensors are provided and correspond with each component of the refrigeration system and are in communication with the refrigeration controller 140. Energy sensors 150 are associated with the compressors 104 and the condenser 126 of the refrigeration system 100. The energy sensors 150 monitor energy consumption of their respective components and relay that information to the controller 140.

Figure 2:
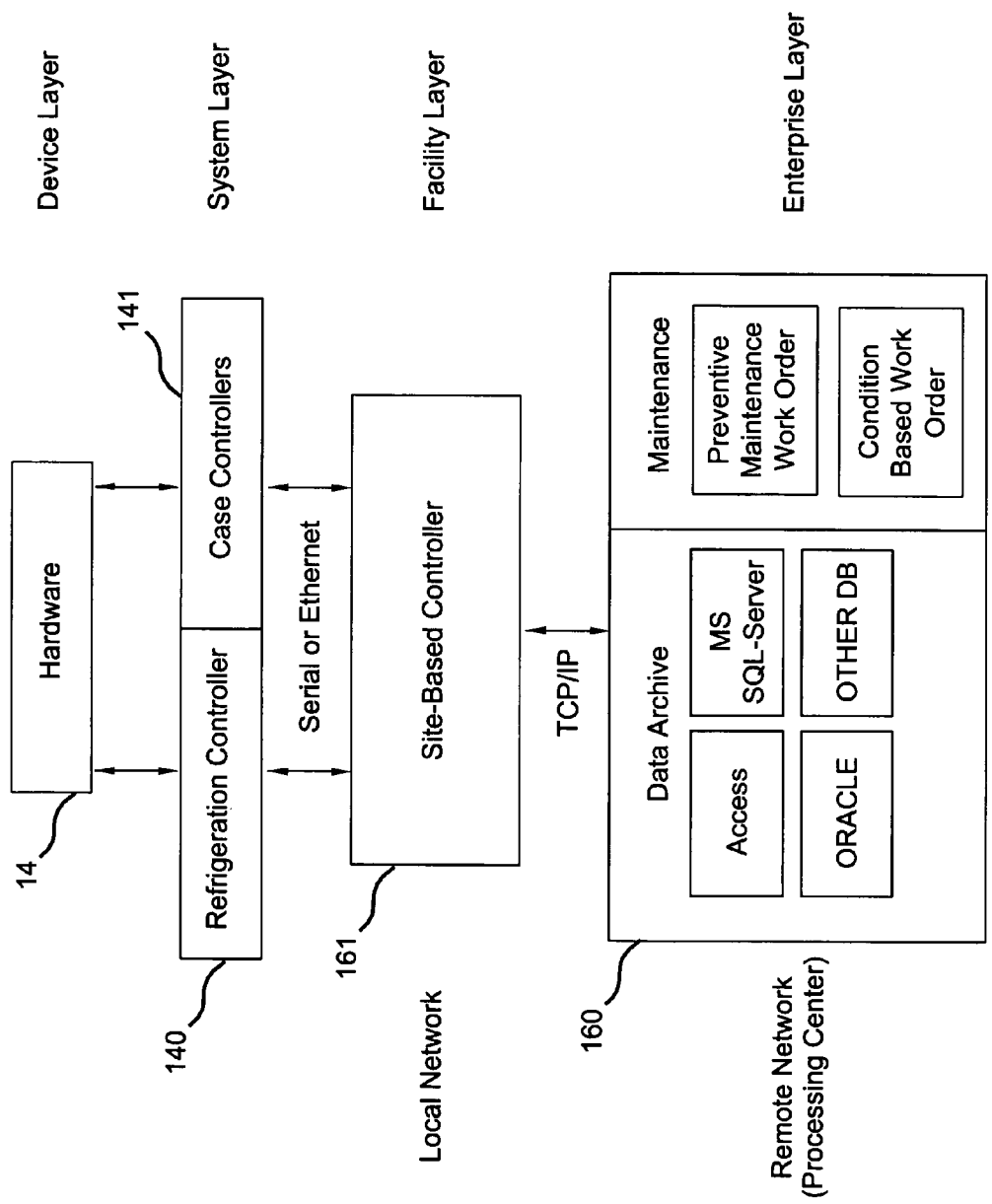
FIG. 2 is a schematic overview of a system for remotely monitoring and evaluating a remote location.

Referring now to FIG. 2, data acquisition and analytical algorithms may reside in one or more layers. The lowest layer is a device layer that includes hardware including, but not limited to, I/O boards that collect signals and may even process some signals. A system layer includes controllers such as the refrigeration controller 140 and case controllers 141. The system layer processes algorithms that control the system components. A facility layer includes a site-based controller 161 that integrates and manages all of the sub-controllers. The site-based controller 161 is a master controller that manages communications to/from the facility.

The highest layer is an enterprise layer that manages information across all facilities and exists within a remote network or processing center 160. It is anticipated that the remote processing center 160 can be either in the same location (e.g., food product retailer) as the refrigeration system 100 or can be a centralized processing center that monitors the refrigeration systems of several remote locations. The refrigeration controller 140 and case controllers 141 initially communicate with the site-based controller 161 via a serial connection, Ethernet, or other suitable network connection. The site-based controller 161 communicates with the processing center 160 via a modem, Ethernet, internet (i.e., TCP/IP) or other suitable network connection.

The processing center 160 collects data from the refrigeration controller 140, the case controllers 141 and the various sensors associated with the refrigeration system 100. For example, the processing center 160 collects information such as compressor, flow regulator and expansion valve set points from the refrigeration controller 140. Data such as pressure and temperature values at various points along the refrigeration circuit are provided by the various sensors via the refrigeration controller 140.

Figure 3:
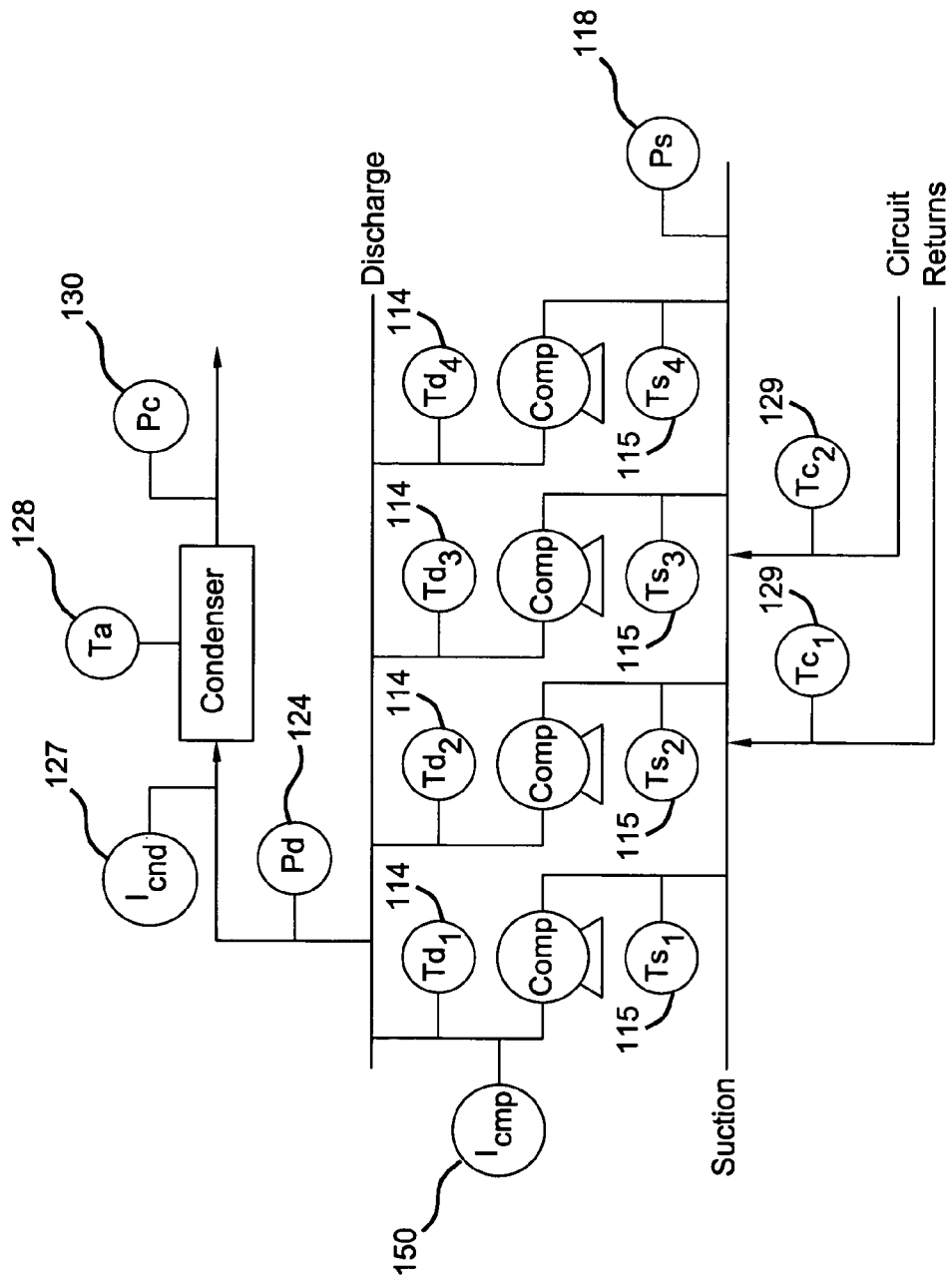
FIG. 3 is a simplified schematic illustration of circuit piping of the refrigeration system of FIG. 1 illustrating measurement sensors.
Figure 4:
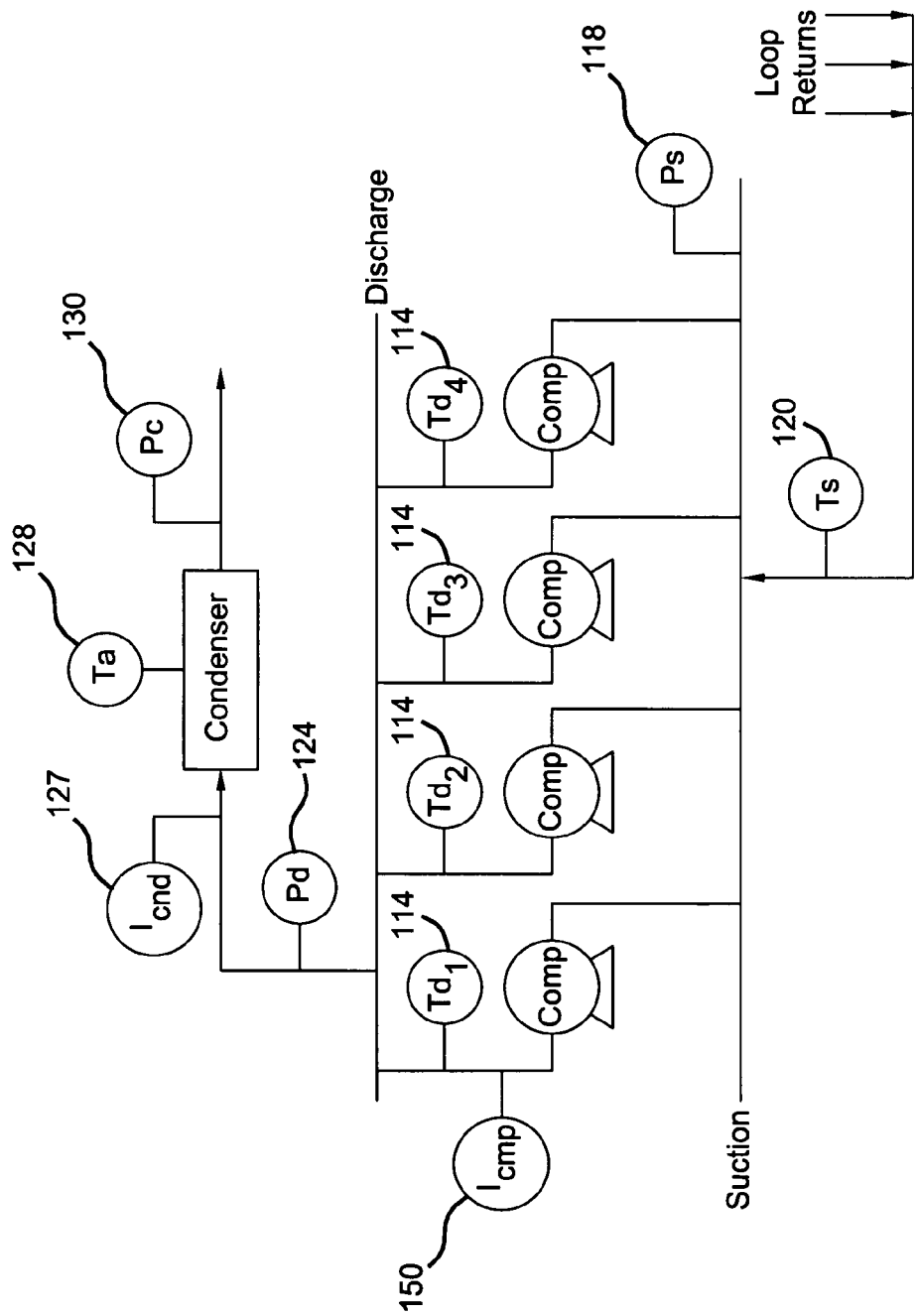
FIG. 4 is a simplified schematic illustration of loop piping of the refrigeration system of FIG. 1 illustrating measurement sensors.

Referring now to FIGS. 3 and 4, for each refrigeration circuit and loop of the refrigeration system 100, several calculations are required to calculate superheat, saturation properties and other values used in the hereindescribed algorithms. These measurements include: ambient temperature ($T_a$), discharge pressure ($P_d$), condenser pressure ($P_c$), suction temperature ($T_s$), suction pressure ($P_s$), refrigeration level (RL), compressor discharge temperature ($T_d$), rack current load ($l_{cmp}$), condenser current load ($l_{cnd}$) and compressor run status. Other accessible controller parameters will be used as necessary. For example, a power sensor can monitor the power consumption of the compressor racks and the condenser. Besides the sensors described above, suction temperature sensors 115 monitor $T_s$ of the individual compressors 104 in a rack and a rack current sensor 150 monitors $l_{cmp}$ of a rack. The pressure sensor 124 monitors $P_d$ and a current sensor 127 monitors $l_{cnd}$. Multiple temperature sensors 129 monitor a return temperature ($T_c$) for each circuit.

The analytical algorithms include common and application algorithms that are preferably provided in the form of software modules. The application algorithms, supported by the common algorithms, predict maintenance requirements for the various components of the refrigeration system 100 and generate notifications that include notices, warnings and alarms. Notices are the lowest of the notifications and simply notify the service provider that something out of the ordinary is happening in the system. A notification does not yet warrant dispatch of a service technician to the facility. Warnings are an intermediate level of the notifications and inform the service provider that a problem is identified which is serious enough to be checked by a technician within a predetermined time period (e.g., 1 month). A warning does not indicate an emergency situation. An alarm is the highest of the notifications and warrants immediate attention by a service technician.

The common algorithms include signal conversion and validation, saturated refrigerant properties, pattern analyzer, watchdog message and recurring notice or alarm message. The application algorithms include condenser performance management (fan loss and dirty condenser), compressor proofing, compressor fault detection, return gas superheat monitoring, compressor contact monitoring, compressor runtime monitoring, refrigerant loss detection and suction/discharge pressure monitoring. Each is discussed in detail below. The algorithms can be processed locally using the refrigeration controller 140 or remotely at the remote processing center 160.

Figure 5:
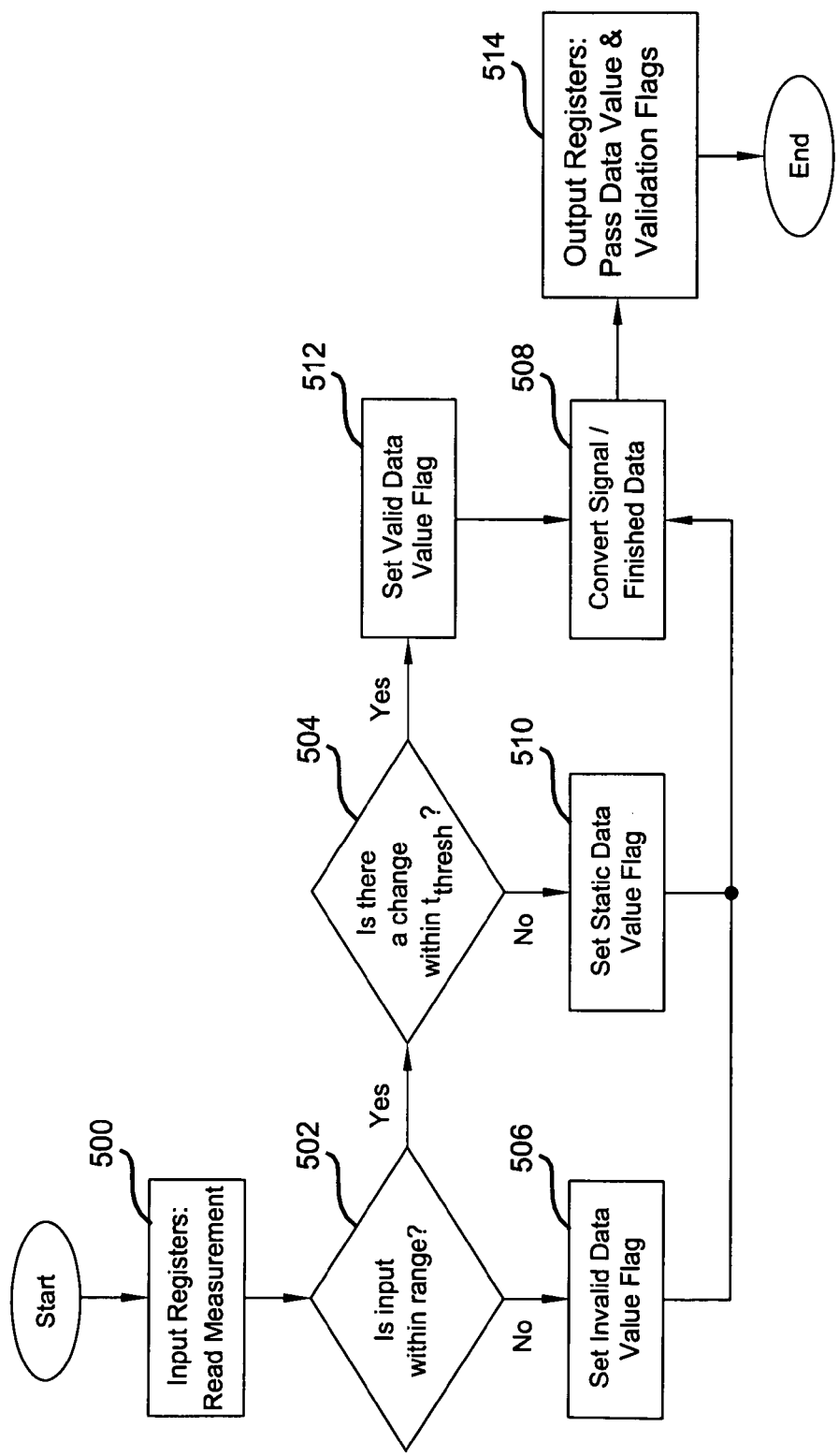
FIG. 5 is a flowchart illustrating a signal conversion and validation algorithm according to the present teachings.
Figure 6:
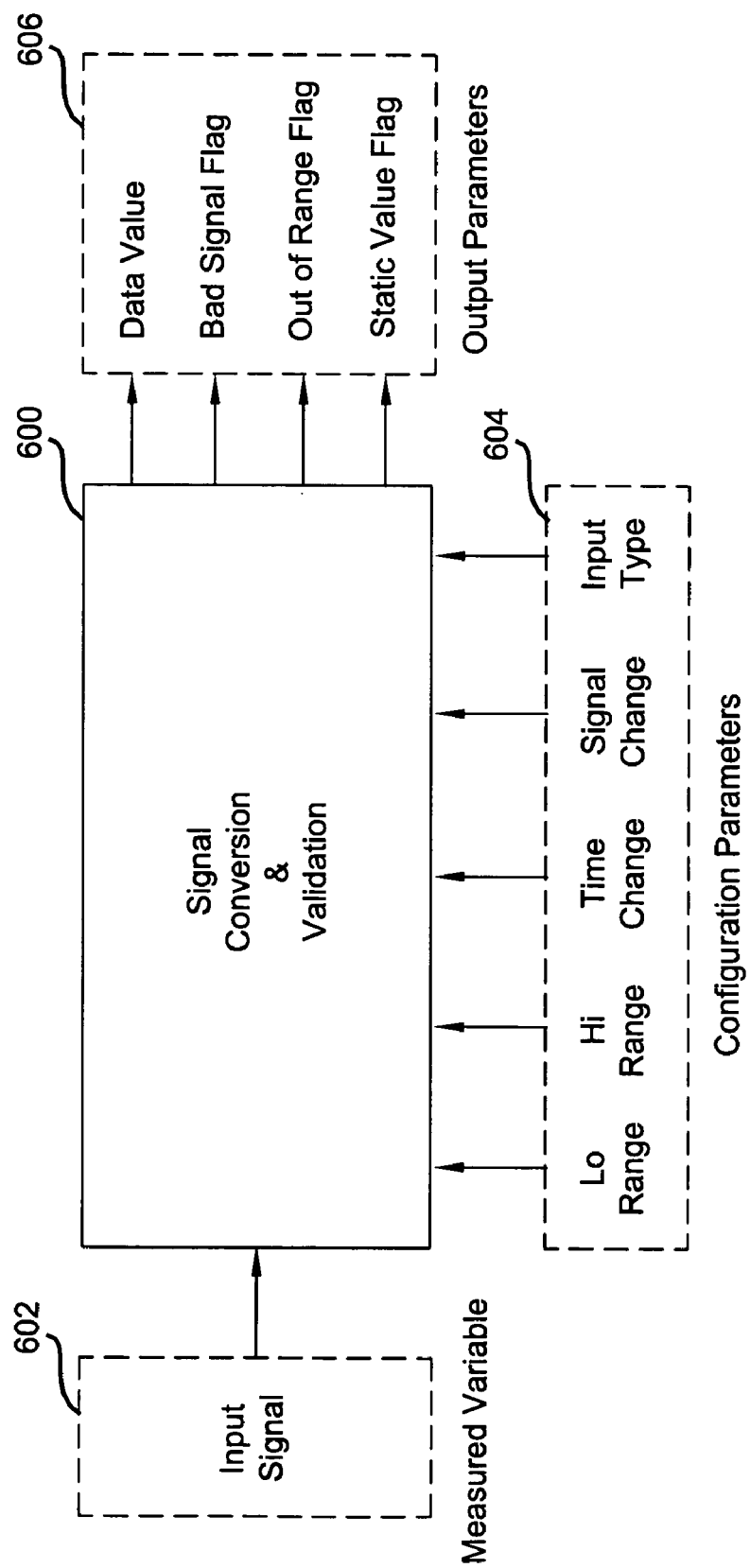
FIG. 6 is a block diagram illustrating configuration and output parameters for the signal conversion and validation algorithm of FIG. 5.

Referring now to FIGS. 5 through 15, the common algorithms will be described in detail. With particular reference to FIGS. 5 and 6, the signal conversion and validation (SCV) algorithm processes measurement signals from the various sensors. The SCV algorithm determines the value of a particular signal and up to three different qualities including whether the signal is within a useful range, whether the signal changes over time and/or whether the actual input signal from the sensor is valid.

Referring now to FIG. 5, in step 500, the input registers read the measurement signal of a particular sensor. In step 502, it is determined whether the input signal is within a range that is particular to the type of measurement. If the input signal is within range, the SCV algorithm continues in step 504. If the input signal is not within the range an invalid data range flag is set in step 506 and the SCV algorithm continues in step 508. In step 504, it is determined whether there is a change ($\Delta$) in the signal within a threshold time ($t_{thresh}$). If there is no change in the signal it is deemed static. In this case, a static data value flag is set in step 510 and the SCV algorithm continues in step 508. If there is a change in the signal a valid data value flag is set in step 512 and the SCV algorithm continues in step 508.

In step 508, the signal is converted to provide finished data. More particularly, the signal is generally provided as a voltage. The voltage corresponds to a particular value (e.g., temperature, pressure, current, etc.). Generally, the signal is converted by multiplying the voltage value by a conversion constant (e.g., °C./V, kPa/V, A/V, etc.). In step 514, the output registers pass the data value and validation flags and control ends.

Referring now to FIG. 6, a block diagram schematically illustrates an SCV block 600. A measured variable 602 is shown as the input signal. The input signal is provided by the instruments or sensors. Configuration parameters 604 are provided and include Lo and Hi range values, a time $\Delta$, a signal $\Delta$ and an input type. The configuration parameters 604 are specific to each signal and each application. Output parameters 606 are output by the SCV block 600 and include the data value, bad signal flag, out of range flag and static value flag. In other words, the output parameters 606 are the finished data and data quality parameters associated with the measured variable.

Referring now to FIGS. 7 through 10, refrigeration property algorithms will be described in detail. The refrigeration property algorithms provide the saturation pressure ($P_{SAT}$), density and enthalpy based on temperature. The refrigeration property algorithms further provide saturation temperature ($T_{SAT}$) based on pressure. Each algorithm incorporates thermal property curves for common refrigerant types including, but not limited to, R22, R401a (MP39), R402a (HP80), R404a (HP62), R409a and R507c.

Figure 7:
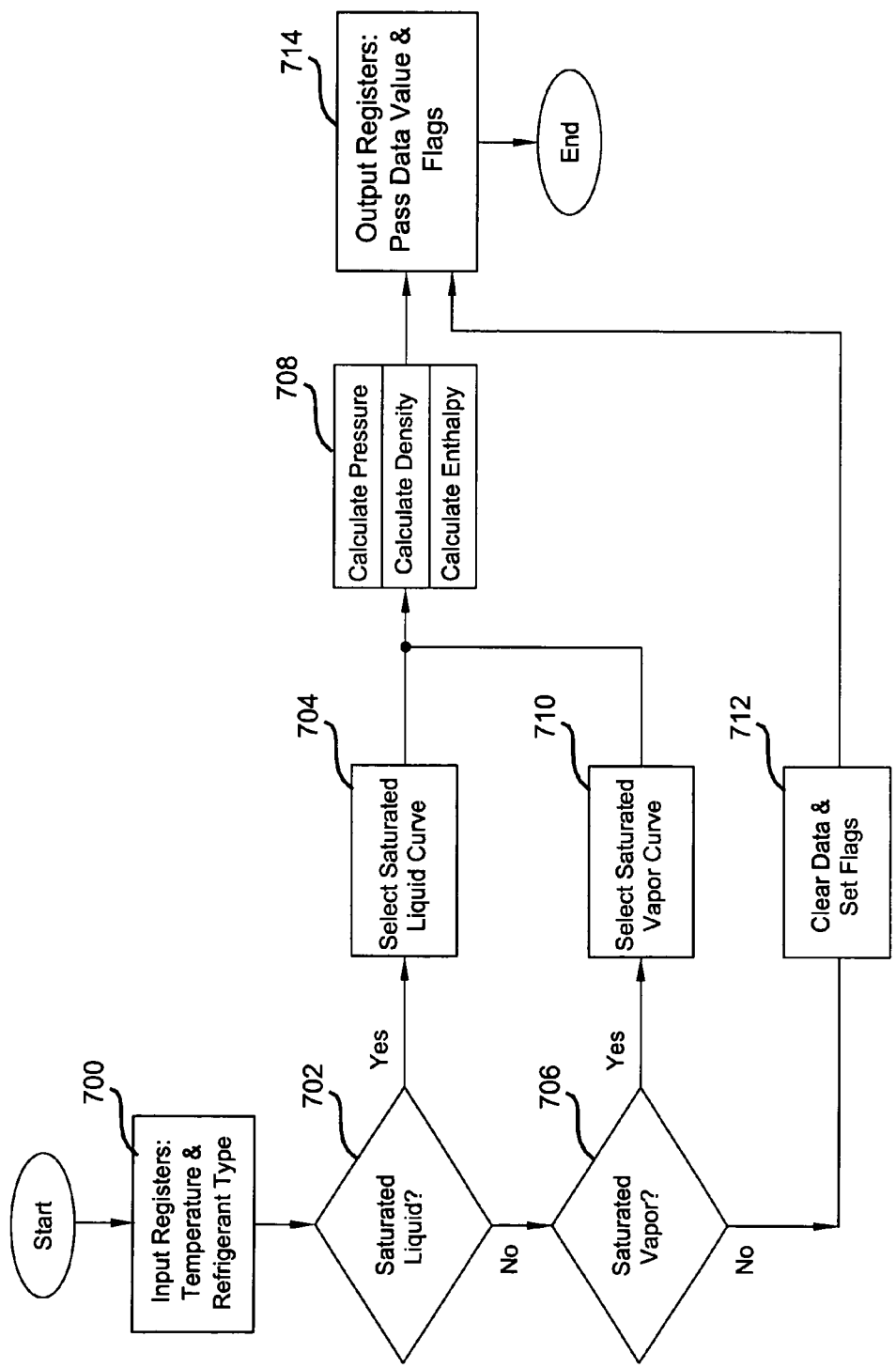
FIG. 7 is a flowchart illustrating a refrigerant properties from temperature (RPFT) algorithm.

With particular reference to FIG. 7, a refrigerant properties from temperature (RPFT) algorithm is shown. In step 700, the temperature and refrigerant type are input. In step 702, it is determined whether the refrigerant is saturated liquid based on the temperature. If the refrigerant is in the saturated liquid state, the RPFT algorithm continues in step 704. If the refrigerant is not in the saturated liquid state, the RPFT algorithm continues in step 706. In step 704, the RPFT algorithm selects the saturated liquid curve from the thermal property curves for the particular refrigerant type and continues in step 708.

In step 706, it is determined whether the refrigerant is in a saturated vapor state. If the refrigerant is in the saturated vapor state, the RPFT algorithm continues in step 710. If the refrigerant is not in the saturated vapor state, the RPFT algorithm continues in step 712. In step 712, the data values are cleared, flags are set and the RPFT algorithm continues in step 714. In step 710, the RPFT algorithm selects the saturated vapor curve from the thermal property curves for the particular refrigerant type and continues in step 708. In step 708, data values for the refrigerant are determined. The data values include pressure, density and enthalpy. In step 714, the RPFT algorithm outputs the data values and flags.

Figure 8:
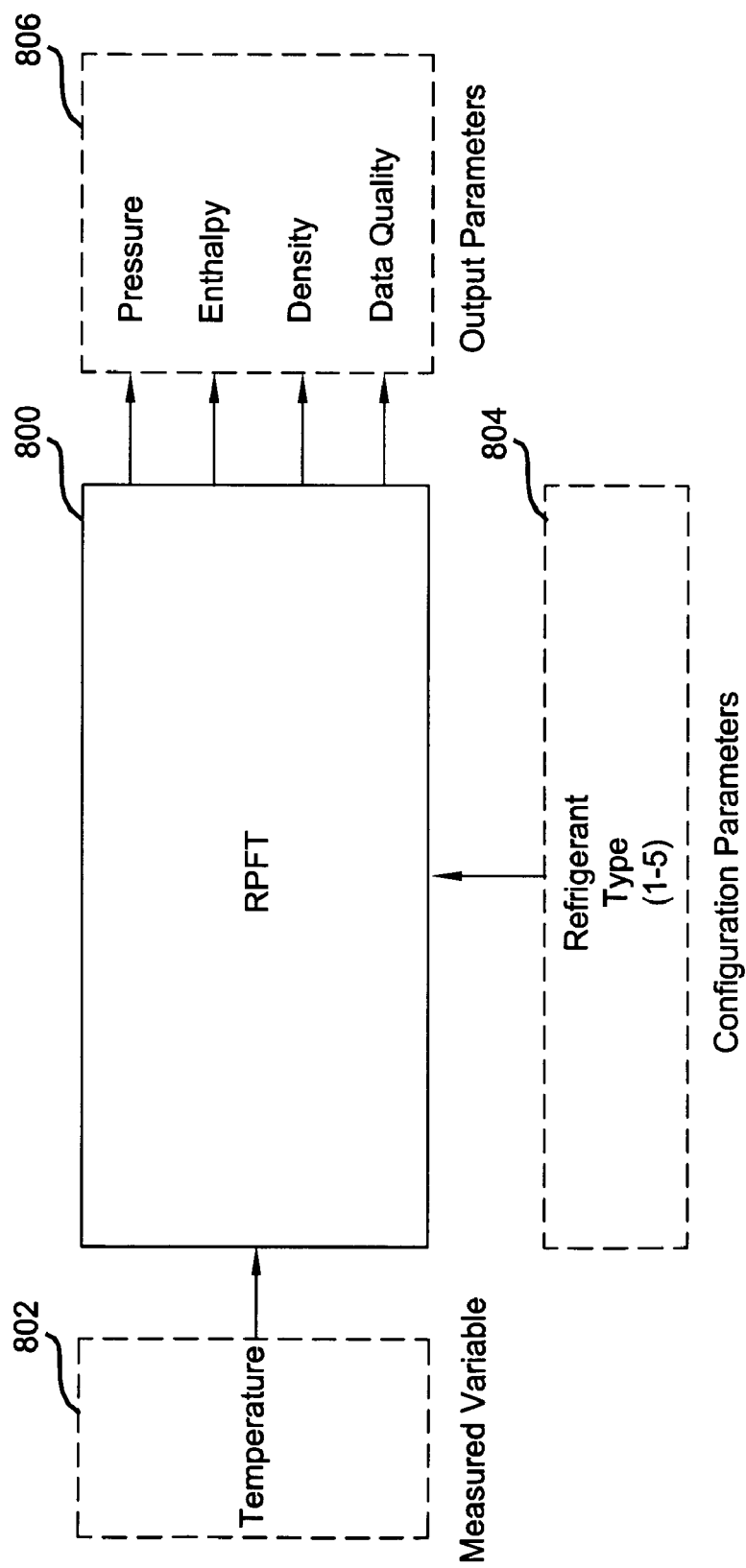
FIG. 8 is a block diagram illustrating configuration and output parameters for the RPFT algorithm.

Referring now to FIG. 8, a block diagram schematically illustrates an RPFT block 800. A measured variable 802 is shown as the temperature. The temperature is provided by the instruments or sensors. Configuration parameters 804 are provided and include the particular refrigerant type. Output parameters 806 are output by the RPFT block 800 and include the pressure, enthalpy, density and data quality flag.

Figure 9:
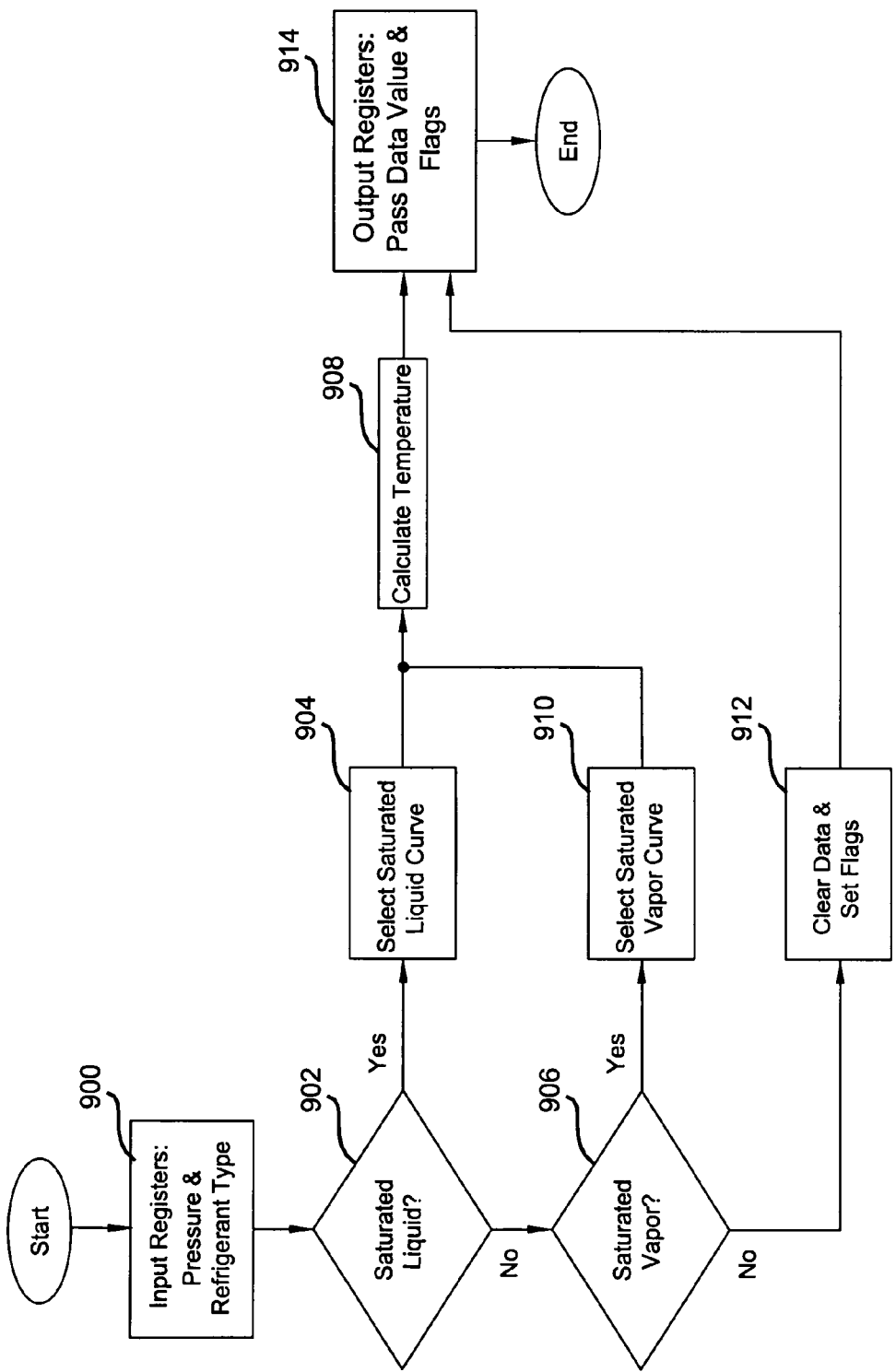
FIG. 9 is a flowchart illustrating a refrigerant properties from pressure (RPFP) algorithm.

With particular reference to FIG. 9 a refrigerant properties from pressure (RPFP) algorithm is shown. In step 900, the temperature and refrigerant type are input. In step 902, it is determined whether the refrigerant is saturated liquid based on the pressure. If the refrigerant is in the saturated liquid state, the RPFP algorithm continues in step 904. If the refrigerant is not in the saturated liquid state, the RPFP algorithm continues in step 906. In step 904, the RPFP algorithm selects the saturated liquid curve from the thermal property curves for the particular refrigerant type and continues in step 908.

In step 906, it is determined whether the refrigerant is in a saturated vapor state. If the refrigerant is in the saturated vapor state, the RPFP algorithm continues in step 910. If the refrigerant is not in the saturated vapor state, the RPFP algorithm continues in step 912. In step 912, the data values are cleared, flags are set and the RPFP algorithm continues in step 914. In step 910, the RPFP algorithm selects the saturated vapor curve from the thermal property curves for the particular refrigerant type and continues in step 908. In step 908, the temperature of the refrigerant is determined. In step 914, the RPFP algorithm outputs the temperature and flags.

Figure 10:
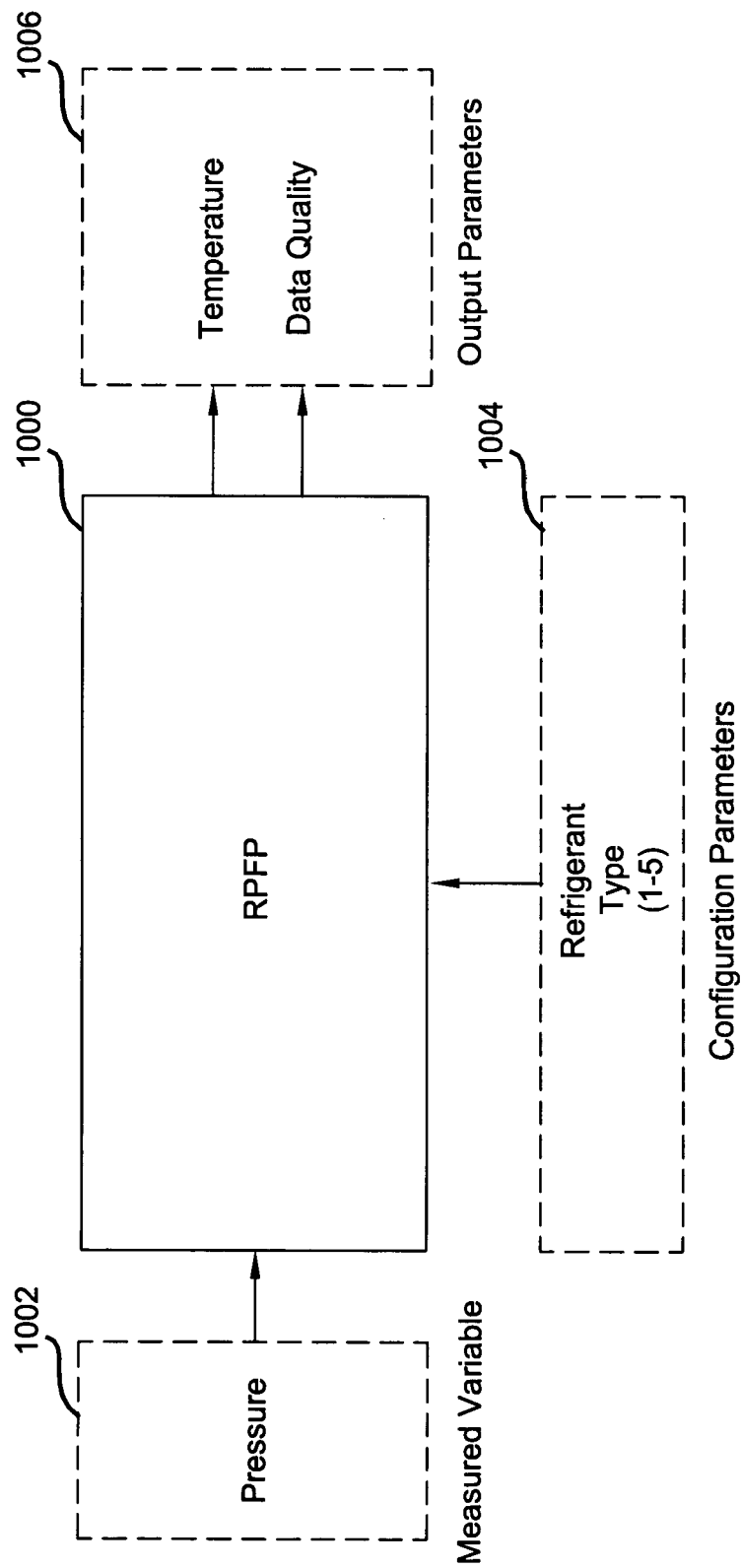
FIG. 10 is a block diagram illustrating configuration and output parameters for the RPFP algorithm.

Referring now to FIG. 10, a block diagram schematically illustrates an RPFP block 1000. A measured variable 1002 is shown as the pressure. The pressure is provided by the instruments or sensors. Configuration parameters 1004 are provided and include the particular refrigerant type. Output parameters 1006 are output by the RPFP block 1000 and include the temperature and data quality flag.

Figure 11:
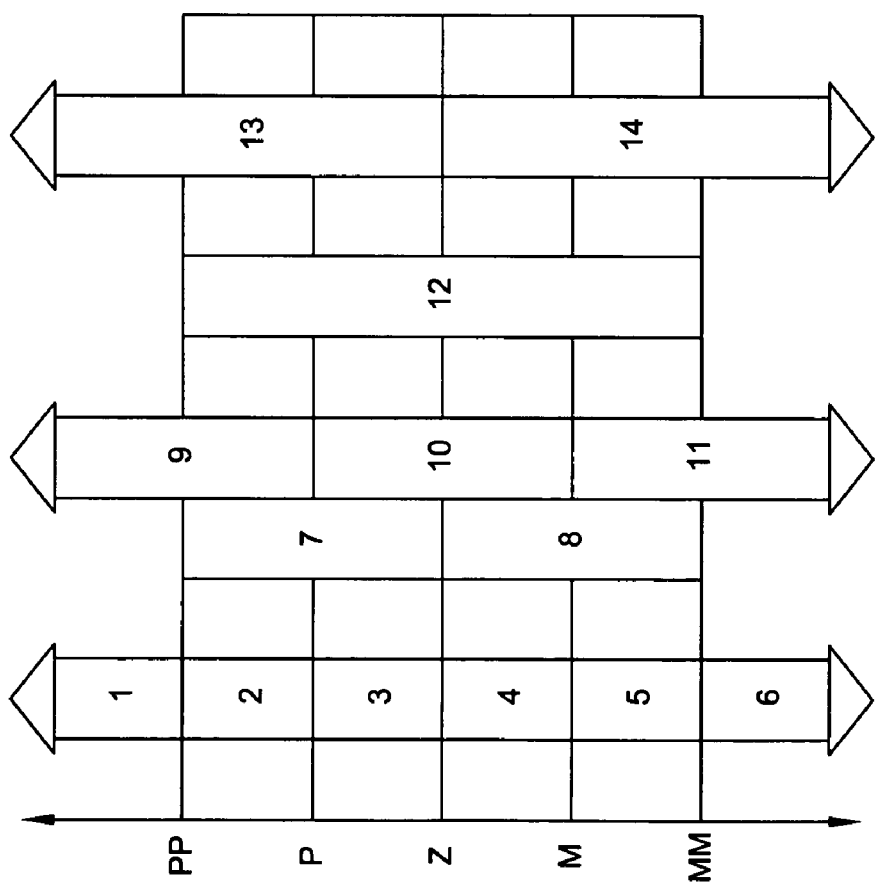
FIG. 11 is a graph illustrating pattern bands of the pattern recognition algorithm
Figure 12:
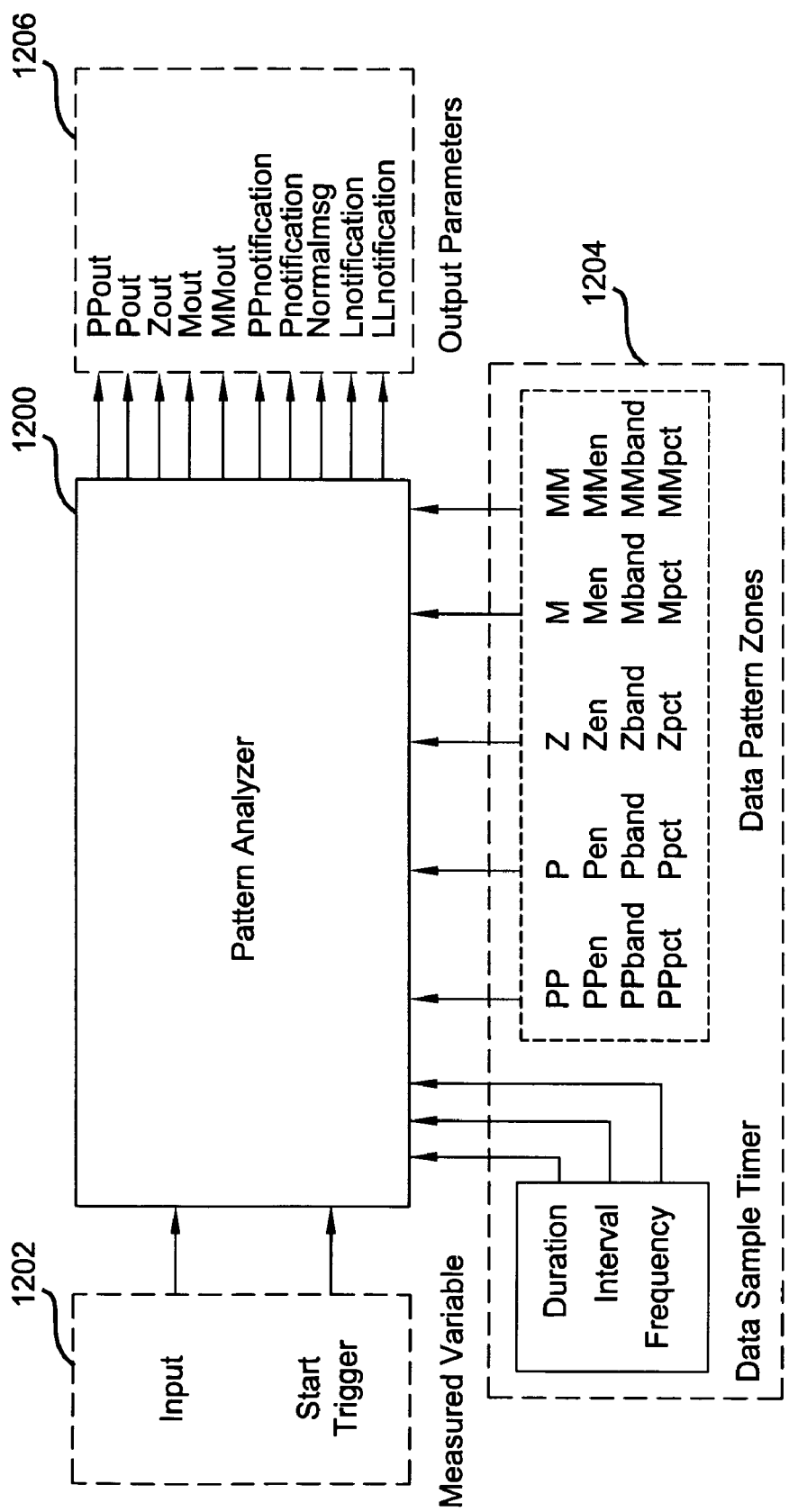
FIG. 12 is a block diagram illustrating configuration and output parameters of a pattern analyzer.
Figure 13:
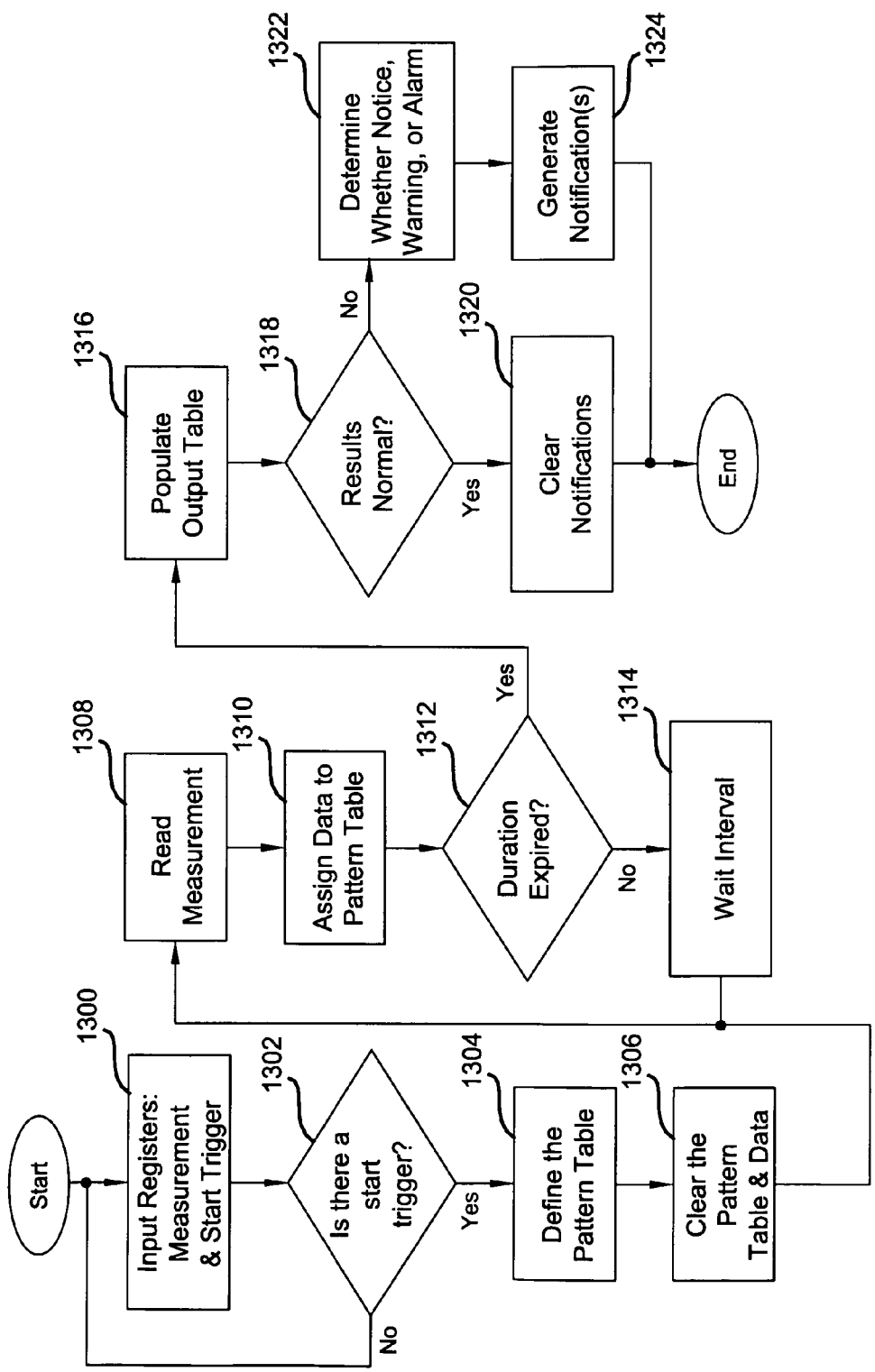
FIG. 13 is a flowchart illustrating a pattern recognition algorithm.

Referring now to FIGS. 11 through 13, the data pattern recognition algorithm or pattern analyzer will be described in detail. The pattern analyzer monitors operating parameter inputs such as case temperature ($T_{CASE}$), product temperature ($T_{PROD}$), $P_s$ and $P_d$ and includes a data table (see FIG. 11) having multiple bands whose upper and lower limits are defined by configuration parameters. A particular input is measured at a configured frequency (e.g., every minute, hour, day, etc.). As the input value changes, the pattern analyzer determines within which band the value lies and increments a counter for that band. After the input has been monitored for a specified time period (e.g., a day, a week, a month, etc.) notifications are generated based on the band populations. The bands are defined by various boundaries including a high positive (PP) boundary, a positive (P) boundary, a zero (Z) boundary, a minus (M) boundary and a high minus (MM) boundary. The number of bands and the boundaries thereof are determined based on the particular refrigeration system operating parameter to be monitored. If the population of a particular band exceeds a notification limit, a corresponding notification is generated.

Referring now to FIG. 12, a pattern analyzer block 1200 receives measured variables 1202, configuration parameters 1204 and generates output parameters 1206 based thereon. The measured variables 1202 include an input (e.g., $T_{CASE}$, $T_{PROD}$, $P_s$ and $P_d$). The configuration parameters 1204 include a data sample timer and data pattern zone information. The data sample timer includes a duration, an interval and a frequency. The data pattern zone information defines the bands and which bands are to be enabled. For example, the data pattern zone information provides the boundary values (e.g., PP) band enablement (e.g., PPen), band value (e.g., PPband) and notification limit (e.g., PPpct).

Referring now to FIG. 13, input registers are set for measurement and start trigger in step 1300. In step 1302, the algorithm determines whether the start trigger is present. If the start trigger is not present, the algorithm loops back to step 1300. If the start trigger is present, the pattern table is defined in step 1304 based on the data pattern bands. In step 1306, the pattern table is cleared. In step 1308, the measurement is read and the measurement data is assigned to the pattern table in step 1310.

In step 1312, the algorithm determines whether the duration has expired. If the duration has not yet expired, the algorithm waits for the defined interval in step 1314 and loops back to step 1308. If the duration has expired, the algorithm populates the output table in step 1316. In step 1318, the algorithm determines whether the results are normal. In other words, the algorithm determines whether the population of each band is below the notification limit for that band. If the results are normal, notifications are cleared in step 1320 and the algorithm ends. If the results are not normal, the algorithm determines whether to generate a notice, a warning, or an alarm in step 1322. In step 1324, the notification(s) is/are generated and the algorithm ends.

Figure 14:
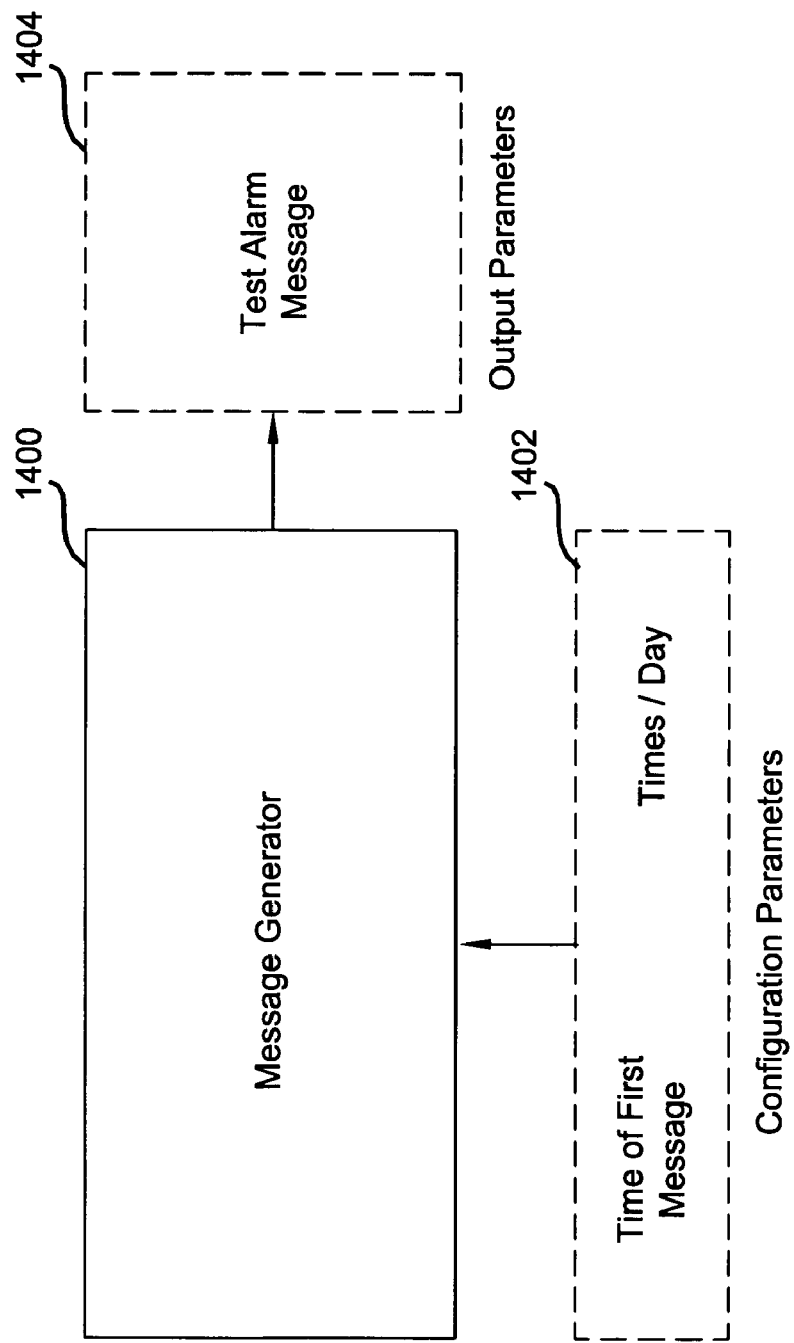
FIG. 14 is a block diagram illustrating configuration and output parameters of a message algorithm.

Referring now to FIG. 14, a block diagram schematically illustrates the watchdog message algorithm, which includes a message generator 1400, configuration parameters 1402 and output parameters 1404. In accordance with the watchdog message algorithm, the site-based controller 161 periodically reports its health (i.e., operating condition) to the remainder of the network. The site-based controller generates a test message that is periodically broadcast. The time and frequency of the message is configured by setting the time of the first message and the number of times per day the test message is to be broadcast. Other components of the network (e.g., the refrigeration controller 140, the processing center 160 and the case controllers) periodically receive the test message. If the test message is not received by one or more of the other network components, a controller communication fault is indicated.

Figure 15:
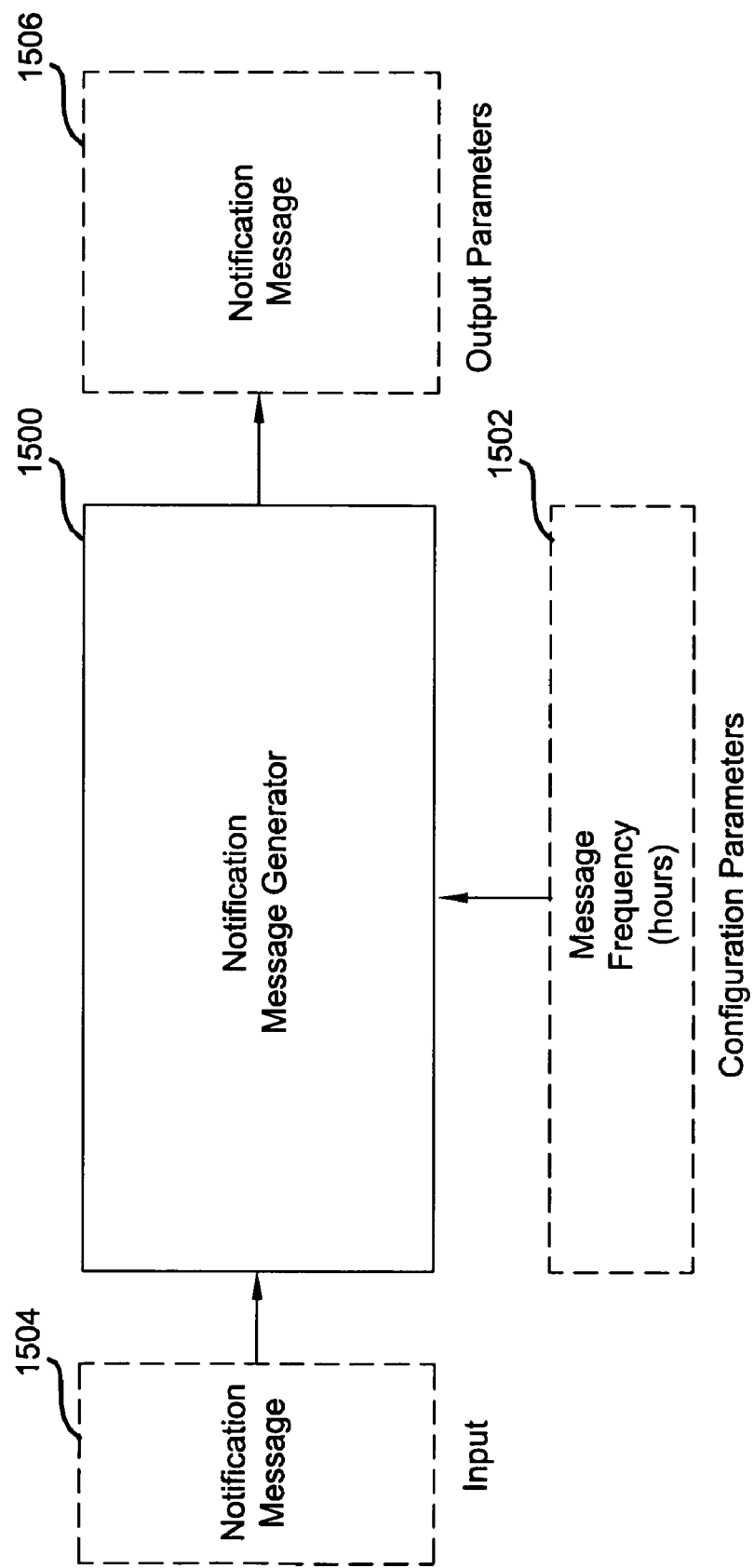
FIG. 15 is a block diagram illustrating configuration and output parameters of a recurring notice/alarm algorithm.

Referring now to FIG. 15, a block diagram schematically illustrates the recurring notification algorithm. The recurring notification algorithm monitors the state of signals generated by the various algorithms described herein. Some signals remain in the notification state for a protracted period of time until the corresponding issue is resolved. As a result, a notification message that is initially generated as the initial notification occurs may be overlooked later. The recurring notification algorithm generates the notification message at a configured frequency. The notification message is continuously regenerated until the alarm condition is resolved.

The recurring notification algorithm includes a notification message generator 1500, configuration parameters 1502, input parameters 1504 and output parameters 1506. The configuration parameters 1502 include message frequency. The input 1504 includes a notification message and the output parameters 1506 include a regenerated notification message. The notification generator 1500 regenerates the input notification message at the indicated frequency. Once the notification condition is resolved, the input 1504 will indicate as such and regeneration of the notification message terminates.

Referring now to FIGS. 16 through 40, the application algorithms will be described in detail. With particular reference to FIGS. 16 through 21, condenser performance degrades due to gradual buildup of dirt and debris on the condenser coil and condenser fan failures. The condenser performance management includes a fan loss algorithm and a dirty condenser algorithm to detect either of these conditions.

Figure 16:
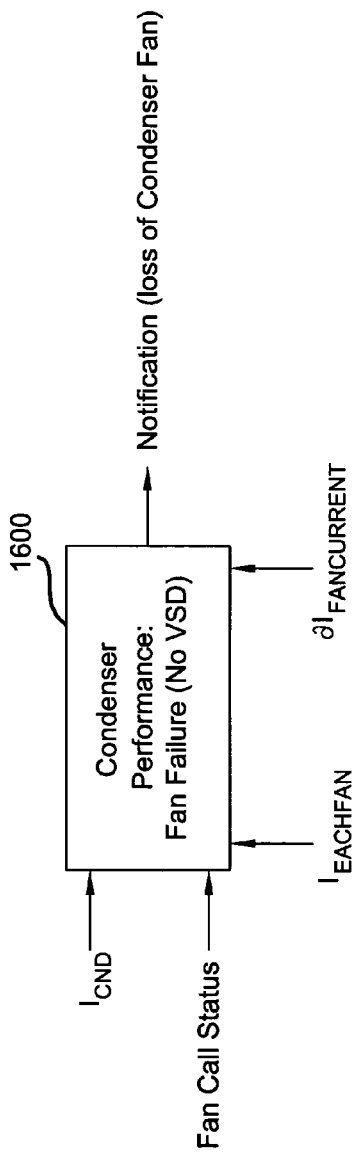
FIG. 16 is a block diagram illustrating configuration and output parameters of a condenser performance monitor for a non-variable sped drive (non-VSD) condenser.
Figure 17:
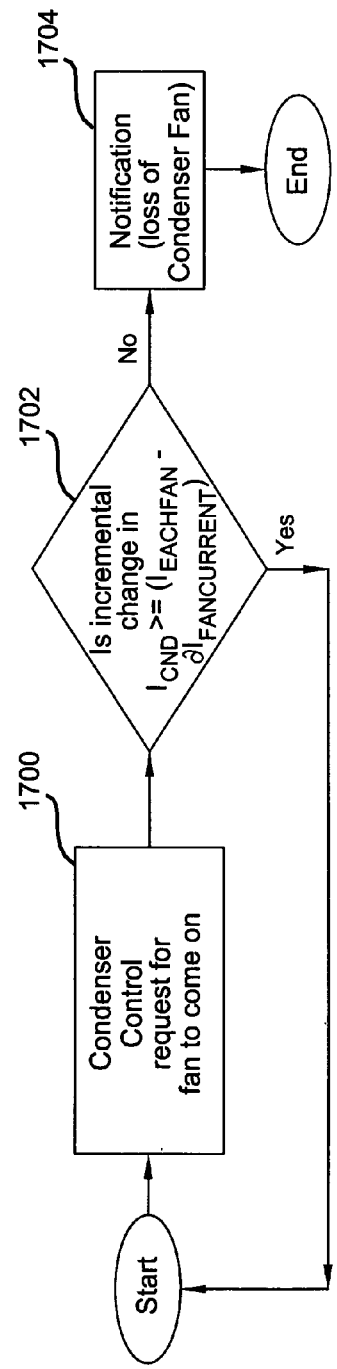
FIG. 17 is a flowchart illustrating a condenser performance algorithm for the non-VSD condenser.

Referring now to FIGS. 16 and 17, the fan loss algorithm for a condenser fan without a variable speed drive (VSD) will be described. A block diagram illustrates a fan loss block 1600 that receives inputs of total condenser fan current ($1_{CND}$), a fan call status, a fan current for each condenser fan ($1_{EACHFAN}$) and a fan current measurement accuracy ($\delta1_{FANCURRENT}$). The fan call status is a flag that indicates whether a fan has been commanded to turn on. The fan current measurement accuracy is assumed to be approximately 10% of $1_{EACHFAN}$ if it is otherwise unavailable. The fan loss block 1600 processes the inputs and can generate a notification if the algorithm deems a fan is not functioning.

Referring to FIG. 17, the condenser control requests that a fan come on in step 1700. In step 1702, the algorithm determines whether the incremental change in $1_{CND}$ is greater than or equal to the difference of $1_{EACHFAN}$ and $\delta1_{FANCURRENT}$. If the incremental change is not greater than or equal to the difference, the algorithm generates a fan loss notification in step 1704 and the algorithm ends. If the incremental change is greater than or equal to the difference, the algorithm loops back to step 1700.

Referring now to FIGS. 18 and 19, the fan loss algorithm for a condenser fan with a VSD will be described. A block diagram illustrates a fan loss block 1800 that receives inputs of $1_{CND}$, the number of fans ON (N), VSD speed (RPM) or output %, $1_{EACHFAN}$ and $\delta1_{FANCURRENT}$. The VSD RPM or output % is provided by a motor control algorithm. The fan loss block 1600 processes the inputs and can generate a notification if the algorithm deems a fan is not functioning.

Referring to FIG. 19, the condenser control calculates and expected current ($1_{EXP}$) in step 1900 based on the following formula:

$$l_{EXP} = N \times l_{EACHFAN} \times (RPM/100)^3$$

In step 1902, the algorithm determines whether $1_{CND}$ is greater than or equal to the difference of $1_{EXP}$ and $\delta1_{FANCURRENT}$. If the incremental change is not greater than or equal to the difference, the algorithm generates a fan loss notification in step 1904 and the algorithm ends. If the incremental change is greater than or equal to the difference, the algorithm loops back to step 1900.

Figure 20:
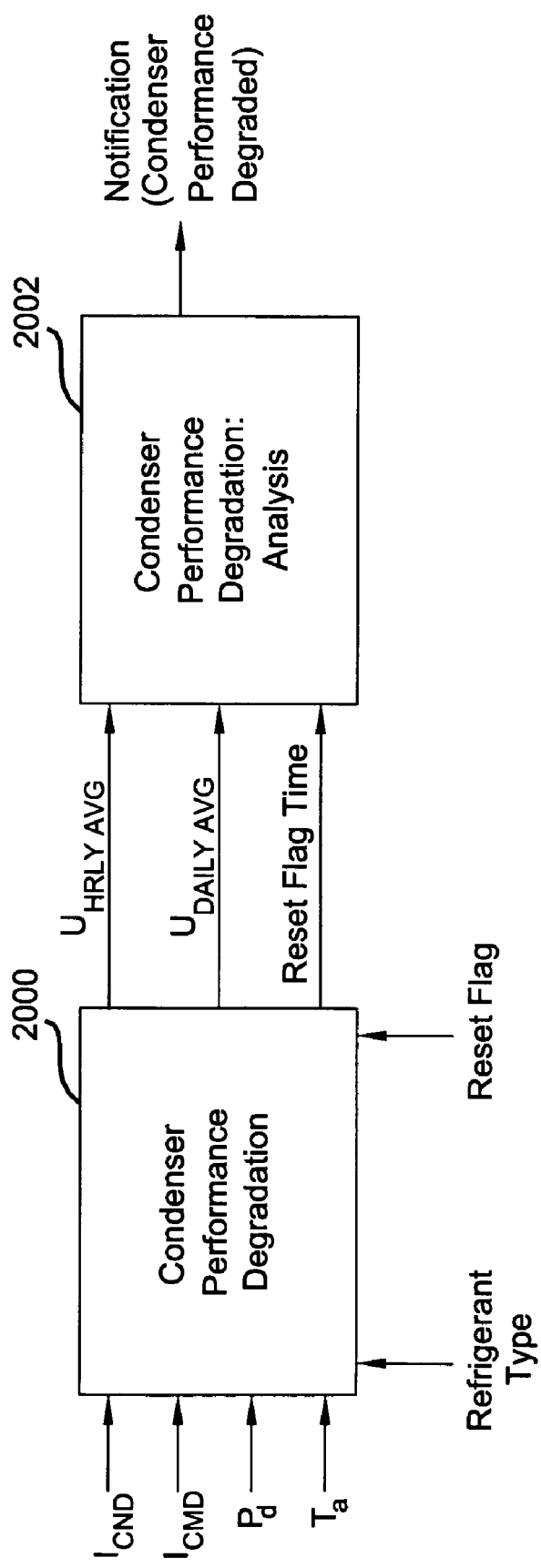
FIG. 20 is a block diagram illustrating inputs and outputs of a condenser performance degradation algorithm.
Figure 21:
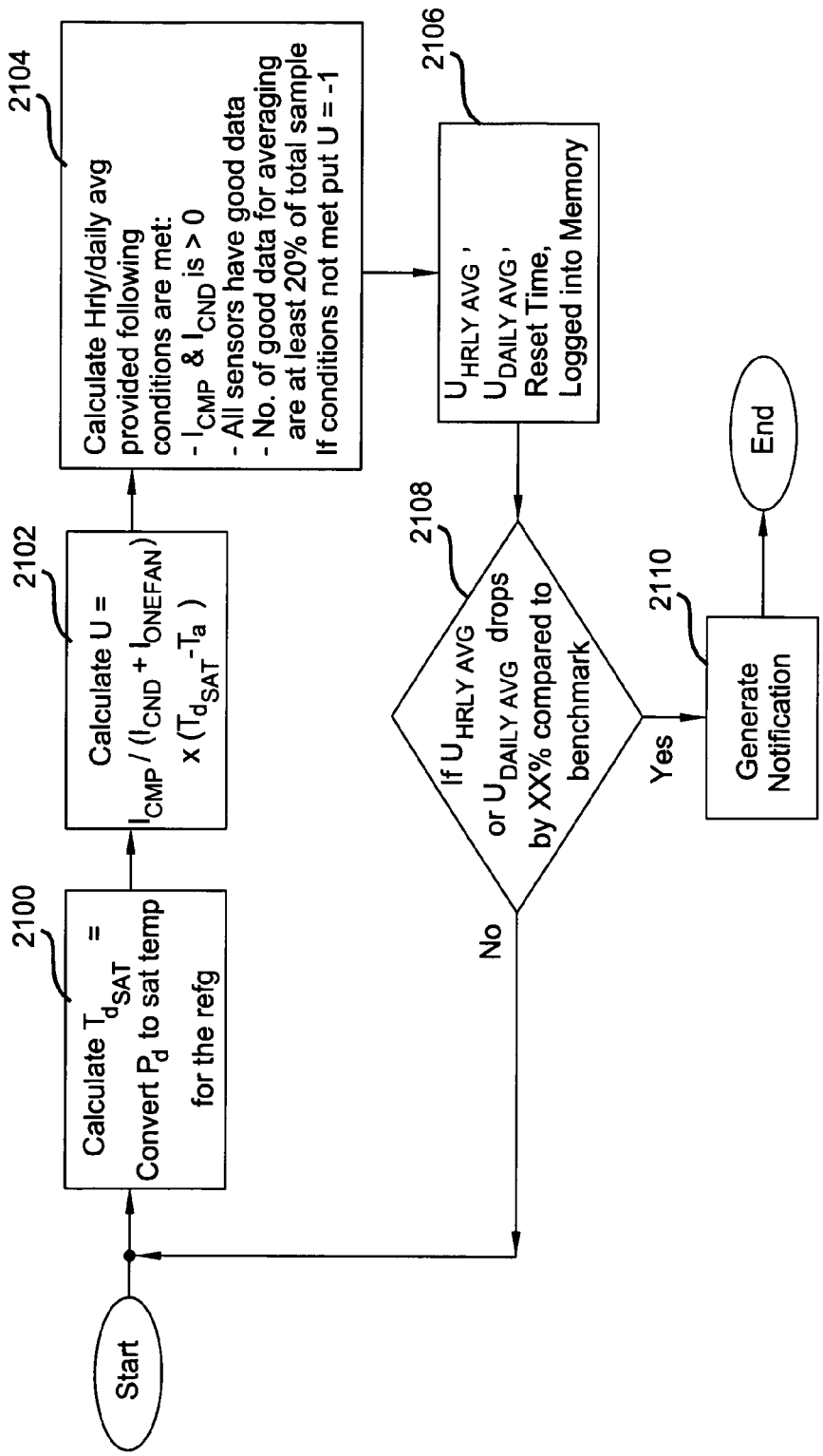
FIG. 21 is a flowchart illustrating the condenser performance degradation algorithm.

Referring specifically to FIGS. 20 and 21, the dirty condenser algorithm will be explained in further detail. Condenser performance degrades due to dirt and debris. The dirty condenser algorithm calculates an overall condenser performance factor (U) for the condenser which corresponds to a thermal efficiency of the condenser. Hourly and daily averages are calculated and stored. A notification is generated based on a drop in the U averages. A condenser performance degradation block 2000 receives inputs including $1_{CND}$, $1_{CMP}$, $P_d$, $T_a$, refrigerant type and a reset flag. The condenser performance degradation block generates an hourly U average ($U_{HRLYAVG}$), a daily U average ($U_{DAILYAVG}$) and a reset flag time, based on the inputs. Whenever the condenser is cleaned, the field technician resets the algorithm and a benchmark U is created by averaging seven days of hourly data.

A condenser performance degradation analysis block 2002 generates a notification based on $U_{HRLYAVG}$, $U_{DAILYAVG}$ and the reset time flag. Referring now to FIG. 21, the algorithm calculates $T_{DSAT}$ based on $P_d$ in step 2100. In step 2102, the algorithm calculates U based on the following equation:

$$U = \frac{l_{CMP}}{(l_{CND} + l_{onefan})(T_{DSAT} - T_a)}$$

To avoid an error due to division by 0, a small nominal value $1_{onefan}$ is added to the denominator. In this way, even when the condenser is off, and $1_{CND}$ is 0, the equation does not return an error. $1_{onefan}$ corresponds to the normal current of one fan. The In step 2104, the algorithm updates the hourly and daily averages provided that $1_{CMP}$ and $1_{CND}$ are both greater than 0, all sensors are functioning properly and the number of good data for sampling make up at least 20% of the total data sample. If these conditions are not met, the algorithm sets U=−1. The above calculation is based on condenser and compressor current. As can be appreciated, condenser and compressor power, as indicated by a power meter, or PID control signal data may also be used. PID control signal refers to a control signal that directs the component to operate at a percentage of its maximum capacity. A PID percentage value may be used in place of either the compressor or condenser current. As can be appreciated, any suitable indication of compressor or condenser power consumption may be used.

In step 2106, the algorithm logs $U_{HRLYAVG}$, $U_{DAILYAVG}$ and the reset time flag into memory. In step 2108, the algorithm determine whether each of the averages have dropped by a threshold percentage (XX %) as compared to respective benchmarks. If the averages have not dropped by XX %, the algorithm loops back to step 2100. If the averages have dropped by XX %, the algorithm generates a notification in step 2110.

Figure 22:
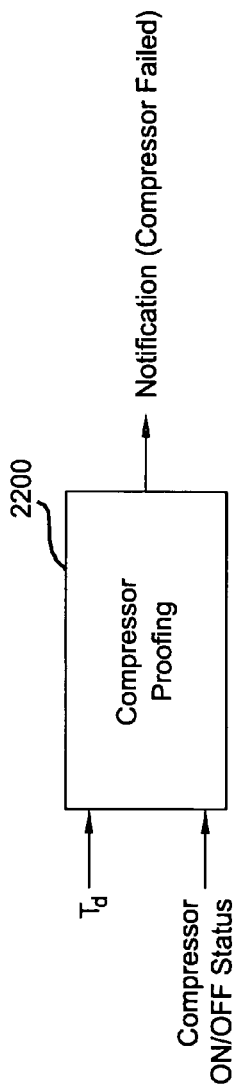
FIG. 22 is a block diagram illustrating inputs and outputs of a compressor proofing algorithm.
Figure 23:
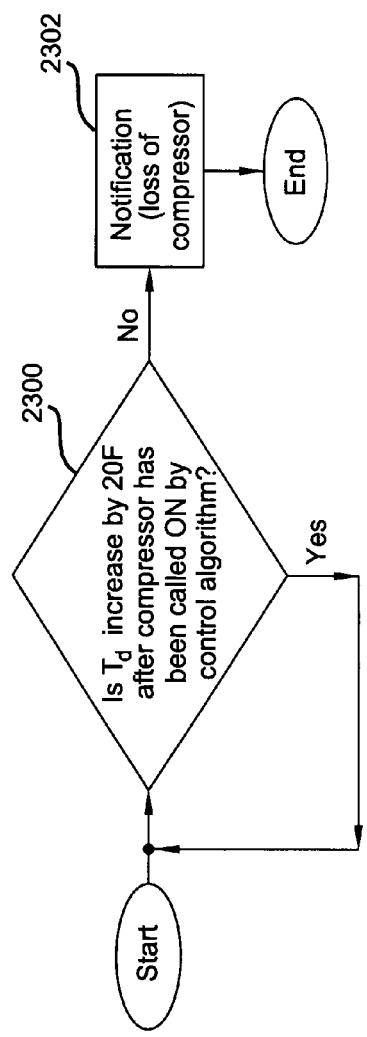
FIG. 23 is a flowchart illustrating the compressor proofing algorithm.

Referring now to FIGS. 22 and 23, the compressor proofing algorithm monitors $T_d$ and the ON/OFF status of the compressor. When the compressor is turned ON, $T_d$ should rise by at least 20° F. A compressor proofing block 2200 receives $T_d$ and the ON/OFF status as inputs. The compressor proofing block 2200 processes the inputs and generates a notification if needed. In step 2300, the algorithm determines whether $T_d$ has increased by at least 20° F. after the status has changed from OFF to ON. If $T_d$ has increased by at least 20° F., the algorithm loops back. If $T_d$ has not increased by at least 20° F., a notification is generated in step 2302.

High compressor discharge temperatures result in lubricant breakdown, worn rings, and acid formation, all of which shorten the compressor lifespan. This condition can indicate a variety of problems including, but not limited to, damaged compressor valves, partial motor winding shorts, excess compressor wear, piston failure and high compression ratios. High compression ratios can be caused by either low suction pressure, high head pressure or a combination of the two. The higher the compression ratio, the higher the discharge temperature. This is due to heat of compression generated when the gasses are compressed through a greater pressure range.

High discharge temperatures (e.g., >300 F) cause oil breakdown. Although high discharge temperatures typically occur in summer conditions (i.e., when the outdoor temperature is high and compressor has some problem), high discharge temperatures can occur in low ambient conditions, when compressor has some problem. Although the discharge temperature may not be high enough to cause oil break-down, it may still be higher than desired. Running compressor at relatively higher discharge temperatures indicates inefficient operation and the compressor may consume more energy then required. Similarly, lower then expected discharge temperatures may indicate flood-back.

The algorithms detect such temperature conditions by calculating isentropic efficiency ($N_{CMP}$) for the compressor. A lower efficiency indicates a compressor problem and an efficiency close to 100% indicates a flood-back condition.

Figure 24:
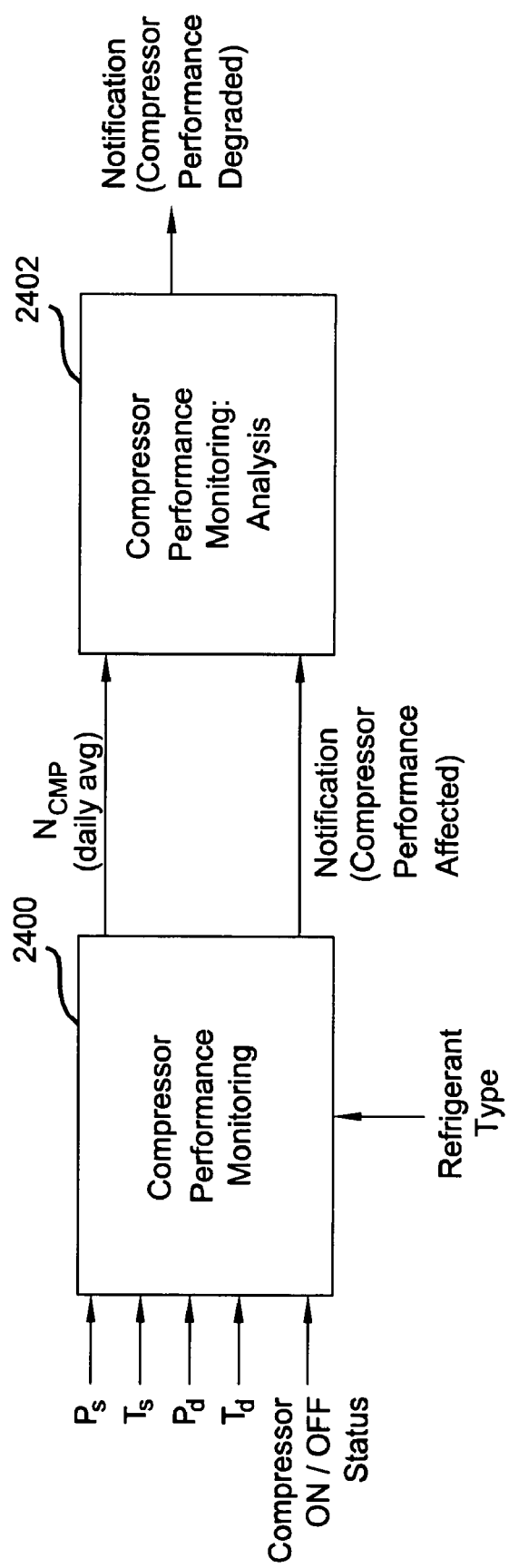
FIG. 24 is a block diagram illustrating inputs and outputs of a compressor performance monitoring algorithm.
Figure 25:
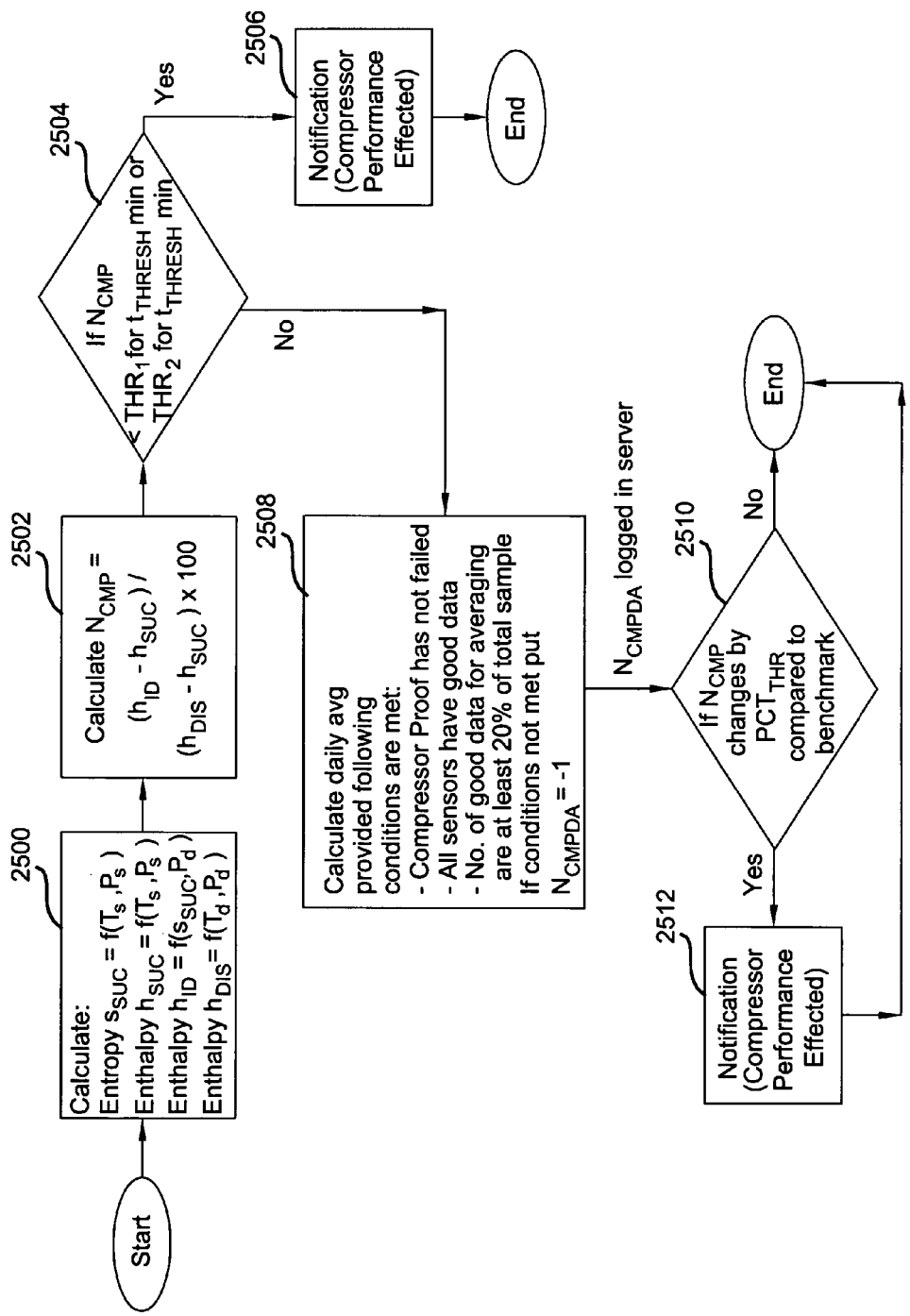
FIG. 25 is a flowchart illustrating the compressor performance monitoring algorithm.

Referring now to FIGS. 24 and 25, the compressor fault detection algorithm will be discussed in detail. A compressor performance monitoring block 2400 receives $P_s$, $T_s$, $P_d$, $T_d$, compressor ON/OFF status and refrigerant type as inputs. The compressor performance monitoring block 2400 generates $N_{CMP}$ and a notification based on the inputs. A compressor performance analysis block selectively generates a notification based on a daily average of $N_{CMP}$.

With particular reference to FIG. 25, the algorithm calculates suction entropy ($s_{SUC}$) and suction enthalpy ($h_{SUC}$) based on Ts and $P_s$, intake enthalpy ($h_{ID}$) based on $s_{SUC}$, and discharge enthalpy ($h_{DIS}$) based on $T_d$ and $P_d$ in step 2500. In step 2502, control calculates $N_{CMP}$ based on the following equation:

$$N_{CMP}=(h_{ID}-h_{SUC})/(h_{DIS}-h_{SUC})*100$$

In step 2504, the algorithm determines whether $N_{CMP}$ is less than a first threshold ($THR_1$) for a threshold time ($t_{THRESH}$) and whether $N_{CMP}$ is greater than a second threshold ($THR_2$) for $t_{THRESH}$. If $N_{CMP}$ is not less than $THR_1$ for $t_{THRESH}$ and is not greater than $THR_2$ for $t_{THRESH}$, the algorithm continues in step 2508. If $N_{CMP}$ is less than $THR_1$ for $t_{THRESH}$ and is greater than $THR_2$ for $t_{THRESH}$, the algorithm issues a compressor performance effected notification in step 2506 and ends. The thresholds may be predetermined and based on ideal suction enthalpy, ideal intake enthalpy and/or ideal discharge enthalpy. Further, $THR_1$ may be 50%. An $N_{CMP}$ of less than 50% may indicate a refrigeration system malfunction. $THR_2$ may be 90%. An $N_{CMP}$ of more than 90% may indicate a flood back condition.

In step 2508, the algorithm calculates a daily average of $N_{CMP}$ ($N_{CMPDA}$) provided that the compressor proof has not failed, all sensors are providing valid data and the number of good data samples are at least 20% of the total samples. If these conditions are not met, $N_{CMPDA}$ is set equal to −1. In step 2510, the algorithm determines whether $N_{CMPDA}$ has changed by a threshold percent ($PCT_{THR}$) as compared to a benchmark. If $N_{CMPDA}$ has not changed by $PCT_{THR}$, the algorithm loops back to step 2500. If $N_{CMPDA}$ has not changed by $PCT_{THR}$, the algorithm ends. If $N_{CMPDA}$ has changed by $PCT_{THR}$, the algorithm initiates a compressor performance effected notification in step 2512 and the algorithm ends.

Figure 26:
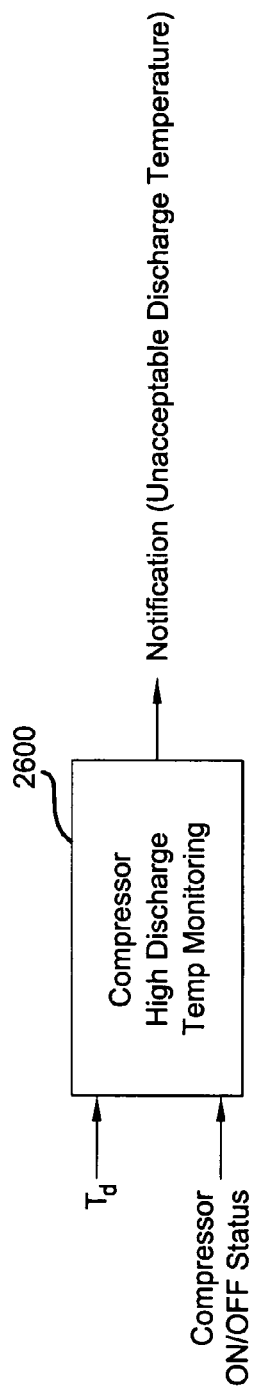
FIG. 26 is a block diagram illustrating inputs and outputs of a compressor high discharge temperature monitoring algorithm.
Figure 27:
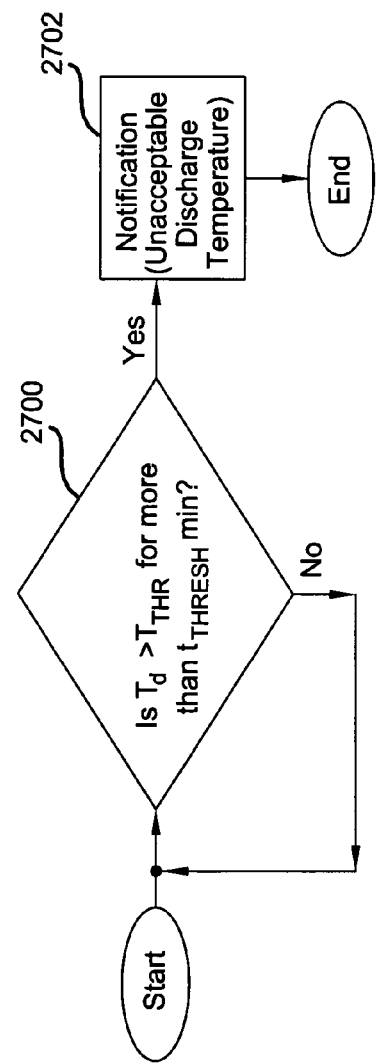
FIG. 27 is a flowchart illustrating the compressor high discharge temperature monitoring algorithm.

Referring now to FIGS. 26 and 27, a high $T_d$ monitoring algorithm will be described in detail. The high $T_d$ monitoring algorithm generates notifications for discharge temperatures that can result in oil beak-down. In general, the algorithm monitors $T_d$ and determines whether the compressor is operating properly based thereon. $T_d$ reflects the latent heat absorbed in the evaporator, evaporator superheat, suction line heat gain, heat of compression, and compressor motor-generated heat. All of this heat is accumulated at the compressor discharge and must be removed. High compressor $T_d$'s result in lubricant breakdown, worn rings, and acid formation, all of which shorten the compressor lifespan. This condition can indicate a variety of problems including, but not limited to damaged compressor valves, partial motor winding shorts, excess compressor wear, piston failure and high compression ratios. High compression ratios can be caused by either low $P_s$, high head pressure, or a combination of the two. The higher the compression ratio, the higher the $T_d$ will be at the compressor. This is due to heat of compression generated when the gasses are compressed through a greater pressure range.

Referring now to FIG. 26, a $T_d$ monitoring block 2600 receives $T_d$ and compressor ON/OFF status as inputs. The $T_d$ monitoring block 2600 processes the inputs and selectively generates an unacceptable $T_d$ notification. Referring now to FIG. 27, the algorithm determines whether $T_d$ is greater than a threshold temperature ($T_{THR}$) for a threshold time ($t_{THRESH}$). If $T_d$ is not greater than $T_{THR}$ for $t_{THRESH}$, the algorithm loops back. If $T_d$ is greater than $T_{THR}$ for $t_{THRESH}$, the algorithm generates an unacceptable discharge temperature notification in step 2702 and the algorithm ends.

Figure 28:
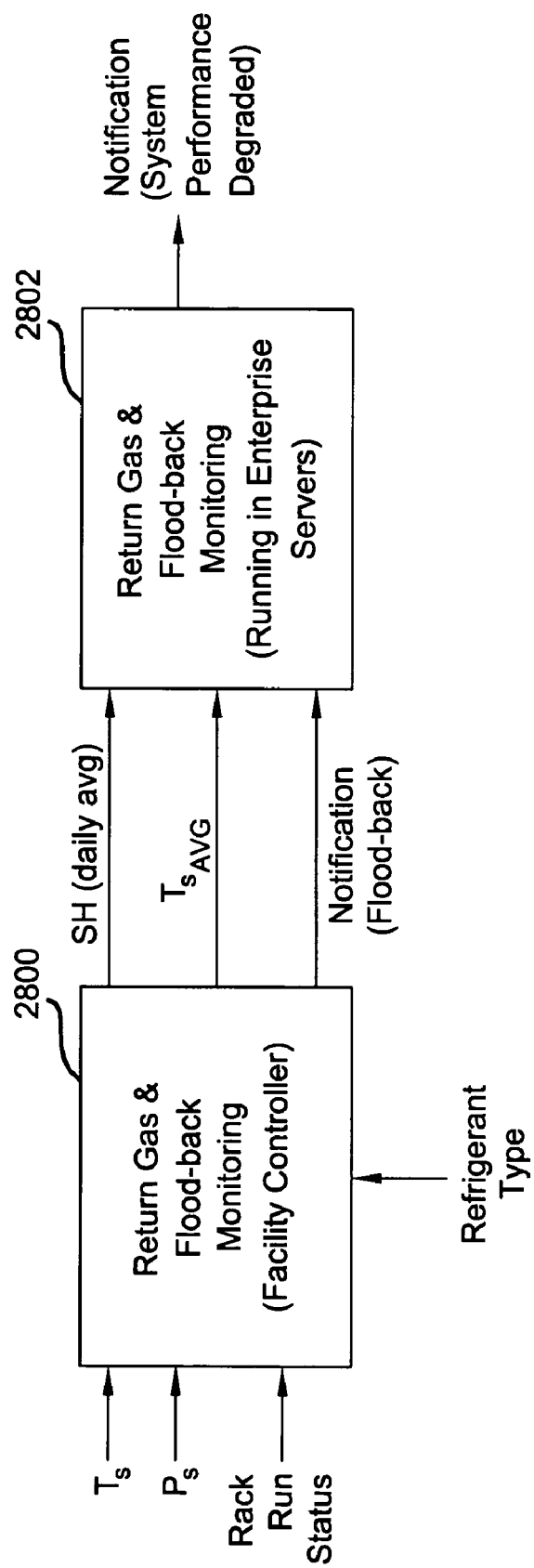
FIG. 28 is a block diagram illustrating inputs and outputs of a return gas and flood-back monitoring algorithm.
Figure 29:
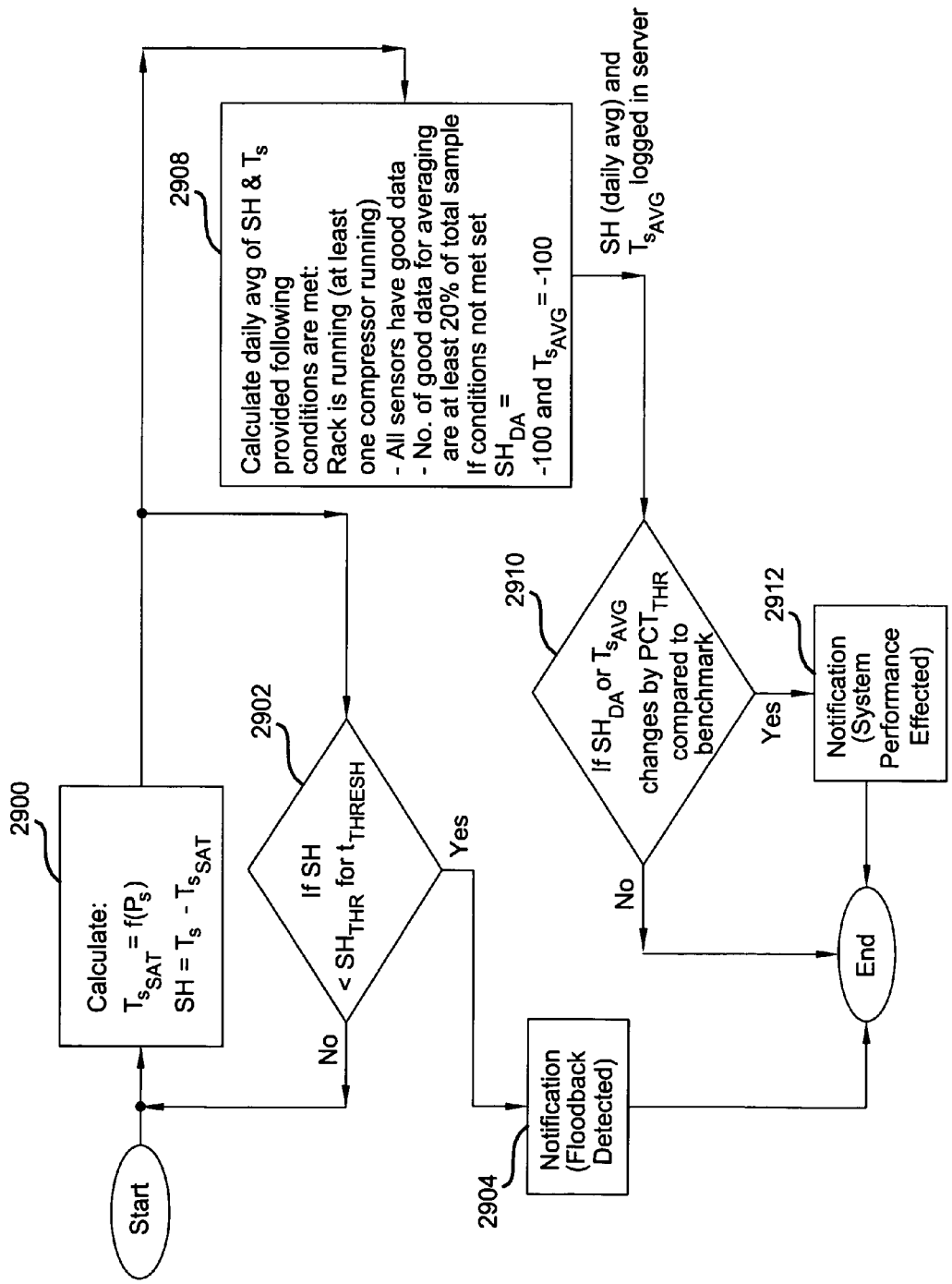
FIG. 29 is a flowchart illustrating the return gas and flood-back monitoring algorithm.

Referring now to FIGS. 28 and 29, the return gas superheat monitoring algorithm will be described in further detail. Liquid flood-back is a condition that occurs while the compressor is running. Depending on the severity of this condition, liquid refrigerant will enter the compressor in sufficient quantities to cause a mechanical failure. More specifically, liquid refrigerant enters the compressor and dilutes the oil in either the cylinder bores or the crankcase, which supplies oil to the shaft bearing surfaces and connecting rods. Excessive flood back (or slugging) results in scoring the rods, pistons, or shafts.

This failure mode results from the heavy load induced on the compressor and the lack of lubrication caused by liquid refrigerant diluting the oil. As the liquid refrigerant drops to the bottom of the shell, it dilutes the oil, reducing its lubricating capability. This inadequate mixture is then picked up by the oil pump and supplied to the bearing surfaces for lubrication. Under these conditions, the connecting rods and crankshaft bearing surfaces will score, wear, and eventually seize up when the oil film is completely washed away by the liquid refrigerant. There will likely be copper plating, carbonized oil, and aluminum deposits on compressor components resulting from the extreme heat of friction.

Some common causes of refrigerant flood back include, but are not limited to inadequate evaporator superheat, refrigerant over-charge, reduced air flow over the evaporator coil and improper metering device (oversized). The return gas superheat monitoring algorithm is designed to generate a notification when liquid reaches the compressor. Additionally, the algorithm also watches the return gas temperature and superheat for the first sign of a flood back problem even if the liquid does not reach the compressor. Also, the return gas temperatures are monitored and a notification is generated upon a rise in gas temperature. Rise in gas temperature may indicate improper settings.

Referring now to FIG. 28, a return gas and flood back monitoring block 2800, receives $T_s$, $P_s$, rack run status and refrigerant type as inputs. The return gas and flood back monitoring block 2800 processes the inputs and generates a daily average superheat (SH), a daily average $T_s$ ($T_{savg}$) and selectively generates a flood back notification. Another return gas and flood back monitoring block 2802 selectively generates a system performance degraded notice based on SH and $T_{savg}$.

Referring now to FIG. 29, the algorithm calculates a saturated $T_s$ ($T_{ssat}$) based on $P_s$ in step 2900. The algorithm also calculates SH as the difference between $T_s$ and $T_{ssat}$ in step 2900. In step 2902, the algorithm determines whether SH is less than a superheat threshold ($SH_{THR}$) for a threshold time ($t_{THRSH}$). If SH is not less than $SH_{THR}$ for $t_{THRSH}$, the algorithm loops back to step 2900. If SH is less than $SH_{THR}$ for $t_{THRSH}$, the algorithm generates a flood back detected notification in step 2904 and the algorithm ends.

In step 2908, the algorithm calculates an SH daily average ($SH_{DA}$) and $T_{savg}$ provided that the rack is running (i.e., at least one compressor in the rack is running, all sensors are generating valid data and the number of good data for averaging are at least 20% of the total data sample. If these conditions are not met, the algorithm sets $SH_{DA}=-100$ and $T_{savg}=-100$. In step 2910, the algorithm determines whether $SH_{DA}$ or $T_{savg}$ change by a threshold percent ($PCT_{THR}$) as compared to respective benchmark values. If neither $SH_{DA}$ nor $T_{savg}$ change by $PCT_{THR}$, the algorithm ends. If either $SH_{DA}$ or $T_{savg}$ changes by $PCT_{THR}$, the algorithm generates a system performance effected algorithm in step 2912 and the algorithm ends.

The algorithm may also calculate a superheat rate of change over time. An increasing superheat may indicate an impending flood back condition. Likewise, a decreasing superheat may indicate an impending degraded performance condition. The algorithm compares the superheat rate of change to a rate threshold maximum and a rate threshold minimum, and determines whether the superheat is increases or decreasing at a rapid rate. In such case, a notification is generated.

Compressor contactor monitoring provides information including, but not limited to, contactor life (typically specified as number of cycles after which contactor needs to be replaced) and excessive cycling of compressor, which is detrimental to the compressor. The contactor sensing mechanism can be either internal (e.g., an input parameter to a controller which also accumulates the cycle count) or external (e.g., an external current sensor or auxiliary contact).

Figure 30:
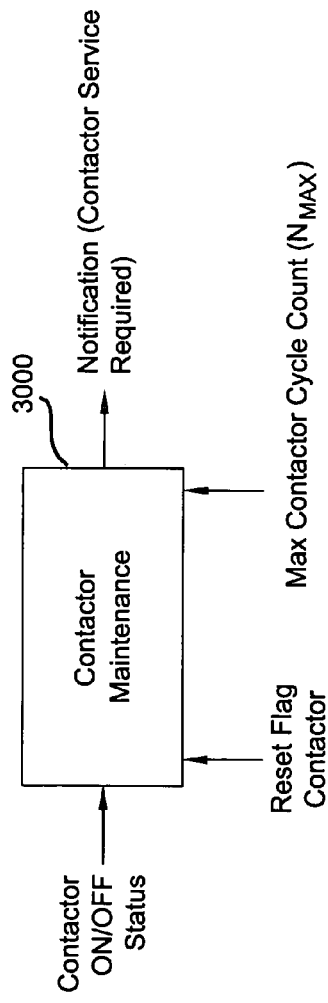
FIG. 30 is a block diagram illustrating inputs and outputs of a contactor maintenance algorithm.

Referring now to FIG. 30, the contactor maintenance algorithm selectively generates notifications based on how long it will take to reach the maximum count using a current cycling rate. For example, if the number of predicted days required to reach maximum count is between 45 and 90 days a notice is generated. If the number of predicted days is between 7 and 45 days a warning is generated and if the number of predicated days is less then 7, an alarm is generated. A contactor maintenance block 3000 receives the contactor ON/OFF status, a contactor reset flag and a maximum contactor cycle count ($N_{MAX}$) as inputs. The contactor maintenance block 3000 generates a notification based on the input.

Figure 31:
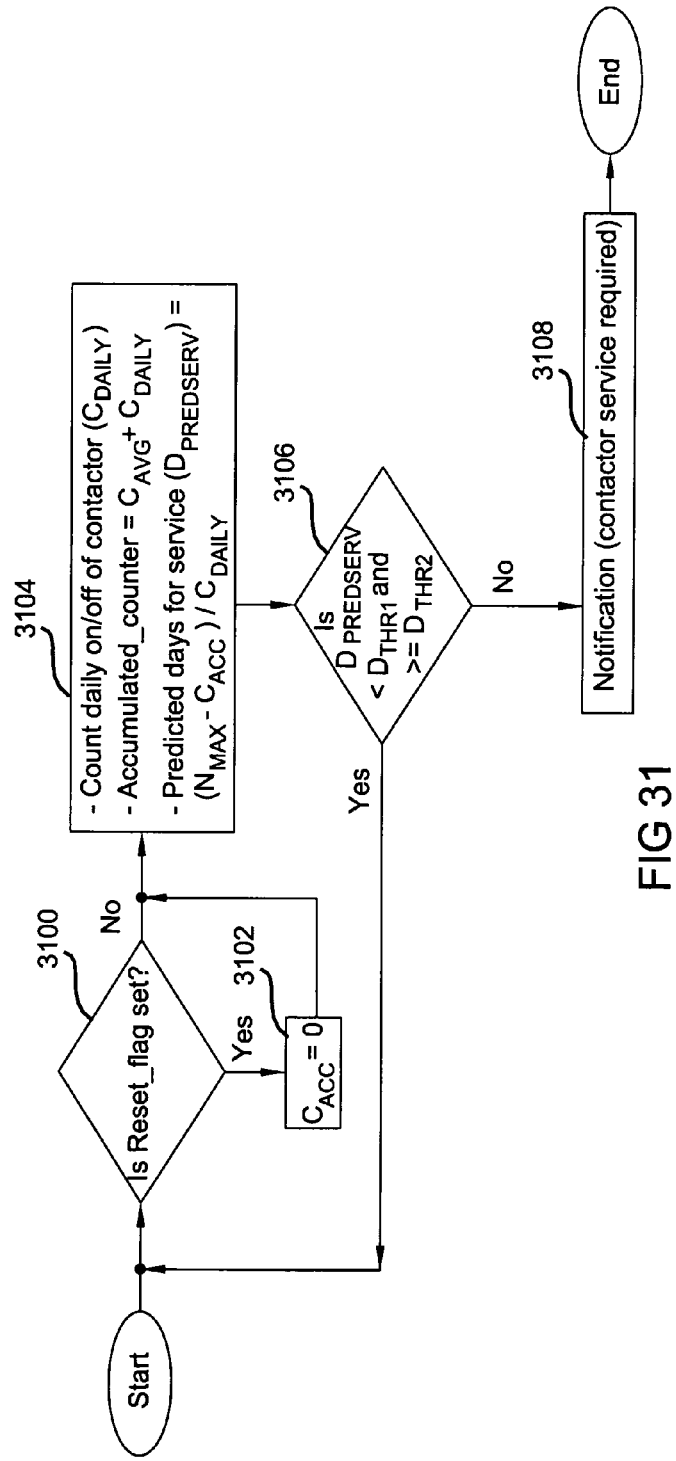
FIG. 31 is a flowchart illustrating the contactor maintenance algorithm.

Referring now to FIG. 31, the algorithm determines whether the reset flag is set in step 3100. If the reset flag is set, the algorithm continues in step 3102. If the reset flag is not set, the algorithm continues in step 3104. In step 3102, the algorithm sets an accumulated counter ($C_{ACC}$) equal to zero. In step 3104, the algorithm determines a daily count ($C_{DAILY}$) of the particular contactor, updates $C_{ACC}$ based on $C_{DAILY}$ and determines the number of predicted days until service ($D_{PREDSERV}$) based on the following equation:

$$D_{PREDSERV}=(N_{MAX}-C_{ACC})/C_{DAILY}$$

In step 3106, the algorithm determines whether $D_{PREDSERV}$ is less than a first threshold number of days ($D_{THR1}$) and is greater than or equal to a second threshold number of days ($D_{THR2}$). If $D_{PREDSERV}$ is less than $D_{THR1}$ and is greater than or equal to $D_{THR2}$, the algorithm loops back to step 3100. If $D_{PREDSERV}$ is not less than $D_{THR1}$ or is not greater than or equal to $D_{THR2}$, the algorithm continues in step 3108. In step 3108, the algorithm generates a notification that contactor service is required and ends.

An excessive contactor cycling algorithm watches for signs of excessive cycling. Excessive cycling of the compressor for an extended period of time reduces the life of compressor. The algorithm generates at least one notification a week to notify of excessive cycling. The algorithm makes use of point system to avoid nuisance alarm. FIG. 32 illustrates a contactor excessive cycling block 3200, which receives contactor ON/OFF status as an input. The contactor excessive cycling block 3200 selectively generates a notification based on the input.

Referring now to FIG. 33, the algorithm determines the number of cycling counts ($N_{CYCLE}$) each hour and assigns cycling points ($N_{POINTS}$) based thereon. For example, if $N_{CYCLE}$/hour is between 6 and 12, $N_{POINTS}$ is equal to 1. if $N_{CYCLE}$/hour is between 12 and 18, $N_{POINTS}$ is equal to 3 and if $N_{CYCLE}$/hour is greater than 18, $N_{POINTS}$ is equal to 1. In step 3302, the algorithm determines the accumulated $N_{POINTS}$ ($N_{POINTSACC}$) for a time period (e.g., 7 days). In step 3304, the algorithm determines whether $N_{POINTSACC}$ is greater than a threshold number of points ($P_{THR}$). If $N_{POINTSACC}$ is not greater than $P_{THR}$, the algorithm loops back to step 3300. If $N_{POINTSACC}$ is greater than $P_{THR}$, the algorithm issues a notification in step 3306 and ends.

Figure 34:
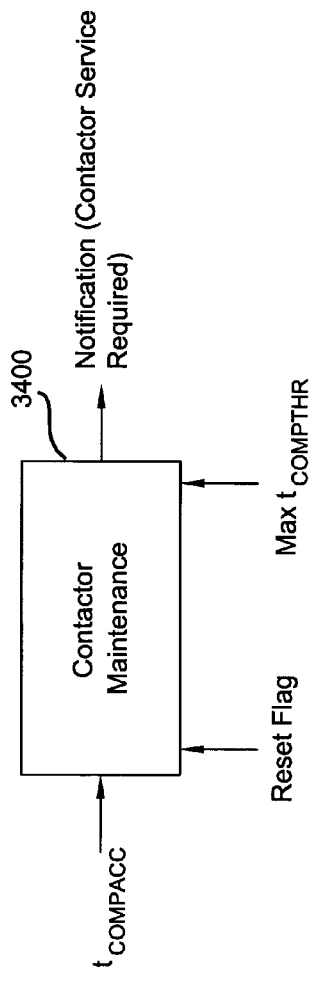
FIG. 34 is a block diagram illustrating inputs and outputs of a contactor maintenance algorithm.

The compressor run-time monitoring algorithm monitors the run-time of the compressor. After a threshold compressor run-time ($t_{COMPTHR}$), a routine maintenance such as oil change or the like is required. When the run-time is close to $t_{COMPTHR}$, a notification is generated. Referring now to FIG. 34, a compressor maintenance block 3400 receives an accumulated compressor run-time ($t_{COMPACC}$), a reset flag and $t_{COMPTHR}$ as inputs. The compressor maintenance block 3400 selectively generates a notification based on the inputs.

Figure 35:
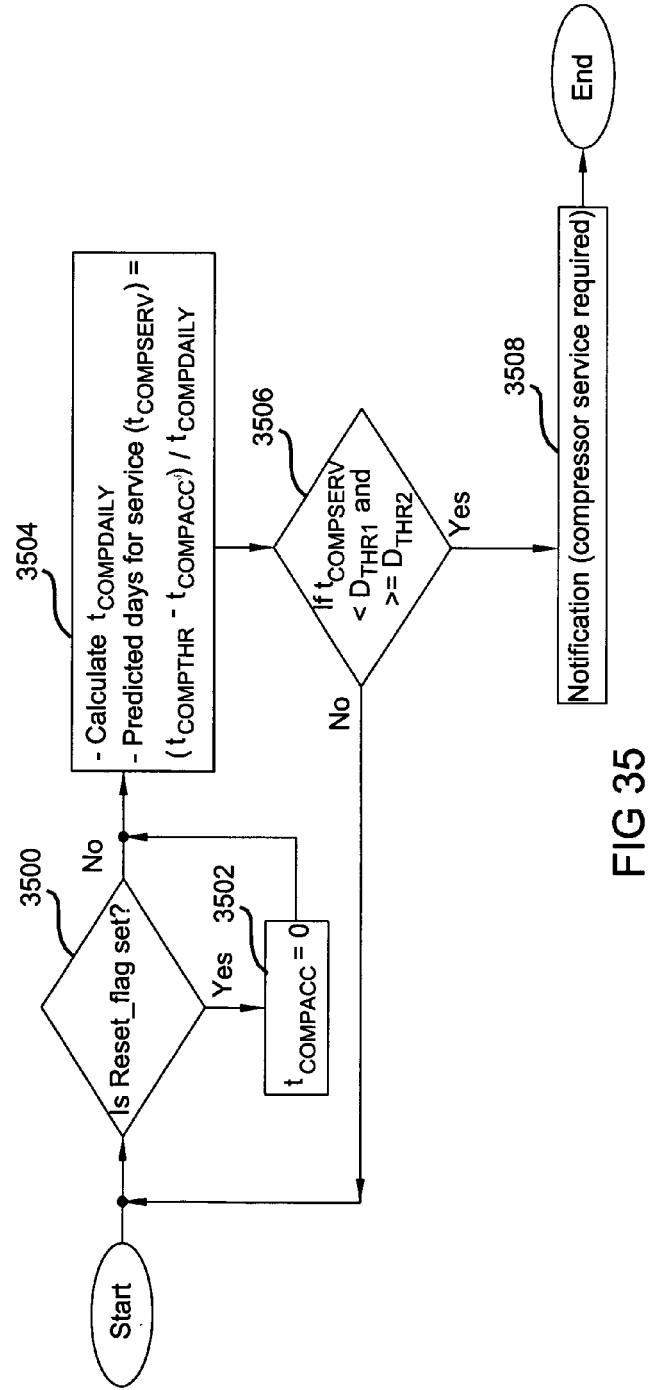
FIG. 35 is a flowchart illustrating the contactor maintenance algorithm.

Referring not to FIG. 35, the algorithm determines whether the reset flag is set in step 3500. If the reset flag is set, the algorithm continues in step 3502. If the reset flag is not set, the algorithm continues in step 3504. In step 3502, the algorithm sets $t_{COMPACC}$ equal to zero. In step 3504, the algorithm calculates the daily compressor run time ($t_{COMPDAILY}$) and predicts the number of days until service is required ($t_{COMPSERV}$) based on the following equation:

$$t_{COMPSERV}=(t_{COMPTHR}-t_{COMPACC})/t_{COMPDAILY}$$

In step 3506, the algorithm determines whether $t_{COMPSERV}$ is less than a first threshold ($D_{THR1}$) and greater than or equal to a second threshold ($D_{THR2}$). If $t_{COMPSERV}$ is not less than $D_{THR1}$ or is not greater than or equal to $D_{THR2}$, the algorithm loops back to step 3500. If $t_{COMPSERV}$ is less than $D_{THR1}$ and is greater than or equal to $D_{THR2}$, the algorithm issues a notification in step 3508 and ends.

Refrigerant level within the refrigeration system 100 is a function of refrigeration load, ambient temperatures, defrost status, heat reclaim status and refrigerant charge. A reservoir level indicator (not shown) reads accurately when the system is running and stable and it varies with the cooling load. When the system is turned off, refrigerant pools in the coldest parts of the system and the level indicator may provide a false reading. The refrigerant loss detection algorithm determines whether there is leakage in the refrigeration system 100.

Refrigerant leak can occur as a slow leak or a fast leak. A fast leak is readily recognizable because the refrigerant level in the optional receiver will drop to zero in a very short period of time. However, a slow leak is difficult to quickly recognize. The refrigerant level in the receiver can widely vary throughout a given day. To extract meaningful information, hourly and daily refrigerant level averages ($RL_{HRLYAVG}$, $RL_{DAILYAVG}$) are monitored. If the refrigerant is not present in the receiver should be present in the condenser. The volume of refrigerant in the condenser is proportional to the temperature difference between ambient air and condenser temperature. Refrigerant loss is detected by collectively monitoring these parameters.

Figure 36:
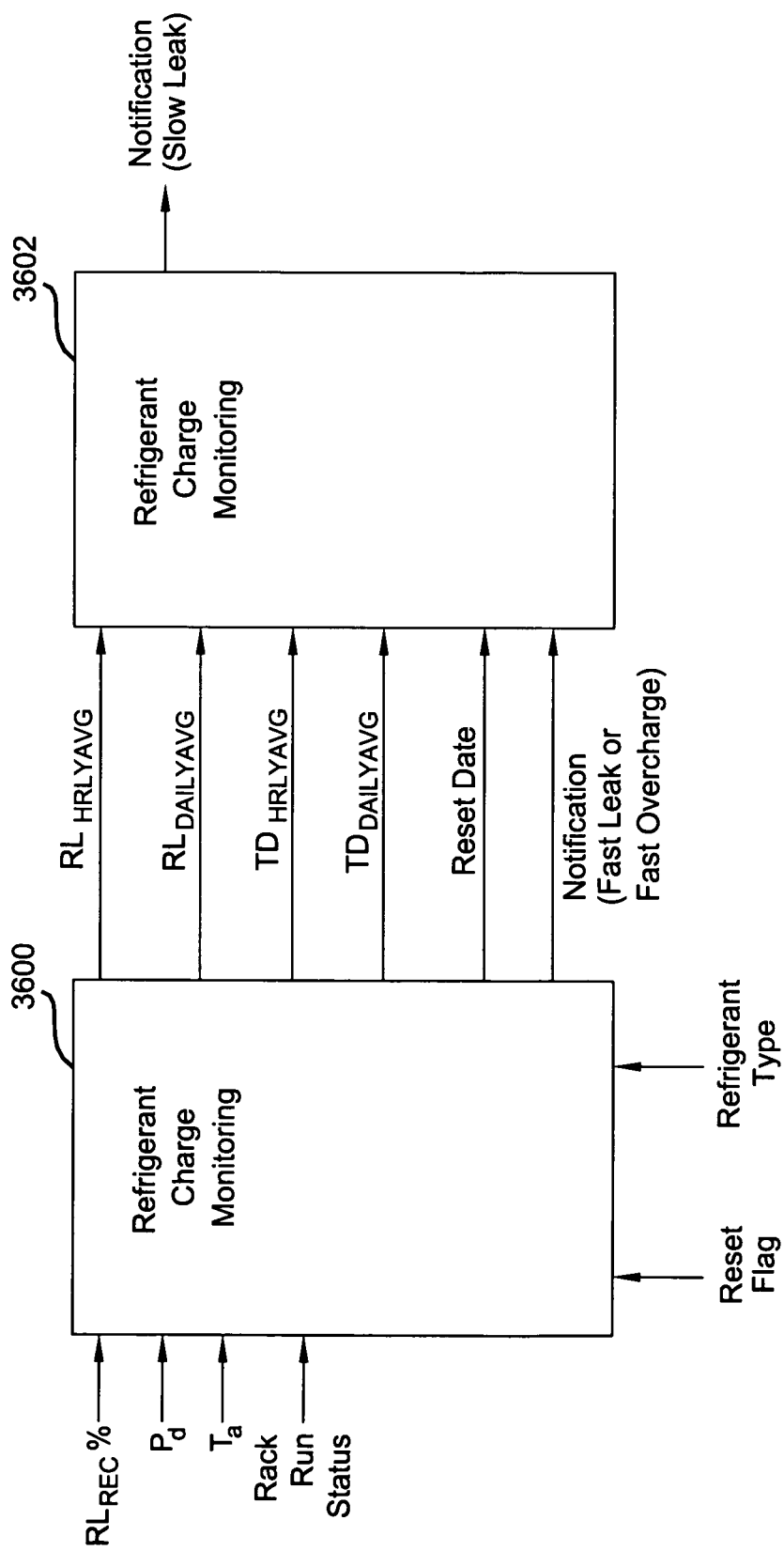
FIG. 36 is a block diagram illustrating inputs and outputs of a refrigerant charge monitoring algorithm.

Referring now to FIG. 36, a first refrigerant charge monitoring block 3600 receives receiver refrigerant level ($RL_{REC}$), $P_d$, $T_a$, a rack run status, a reset flag and the refrigerant type as inputs. The first refrigerant charge monitoring block 3600 generates $RL_{HRLYAVG}$, $RL_{DAILYAVG}$, $TD_{HRLYAVG}$, $TD_{DAILYAVG}$, a reset date and selectively generates a notification based on the inputs. $RL_{HRLYAVG}$, $RL_{DAILYAVG}$, $TD_{HRLYAVG}$, $TD_{DAILYAVG}$ and the reset date are inputs to a second refrigerant charge monitoring block 3602, which selectively generates a notification based thereon. It is anticipated that the first monitoring block 3600 is resident within and processes the algorithm within the refrigerant controller 140. The second monitoring block 3602 is resident within and processes the algorithm within the processing center 160. The algorithm generates a refrigerant level model based on the monitoring of the refrigerant levels. The algorithm determines an expected refrigerant level based on the model, and compares the current refrigerant level to the expected refrigerant level.

Figure 37:
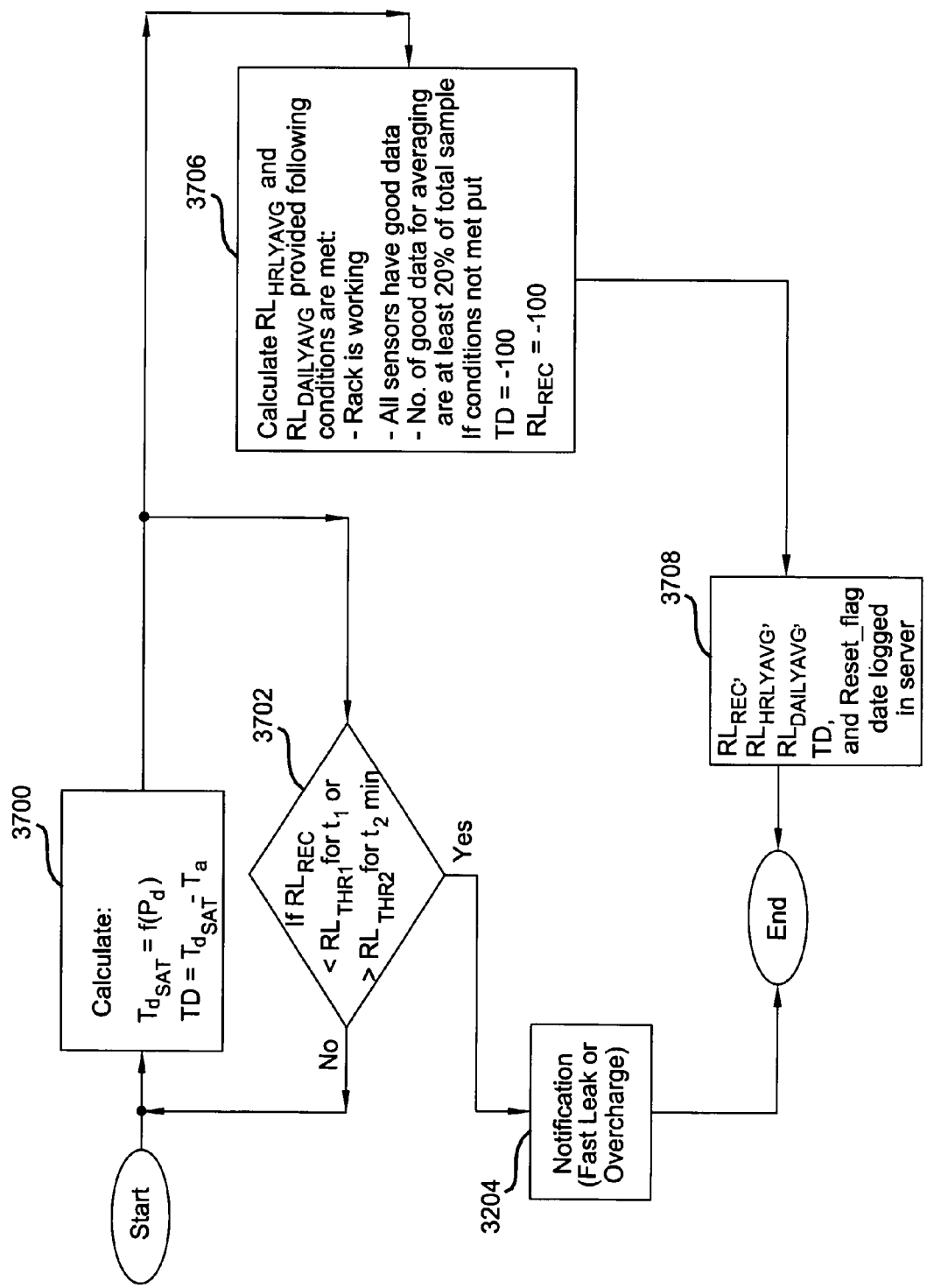
FIG. 37 is a flowchart illustrating the refrigerant charge monitoring algorithm.

Referring now to FIG. 37, the refrigerant loss detection algorithm calculates $T_{dsat}$ based on $P_d$ and calculates TD as the difference between $T_{dsat}$ and $T_a$ in step 3700. In step 3702, the algorithm determines whether $RL_{REC}$ is less than a first threshold ($RL_{THR1}$) for a first threshold time ($t_1$) or whether $RL_{REC}$ is greater than a second threshold ($RL_{THR2}$) for a second threshold time ($t_2$). If $RL_{REC}$ is not less than $RL_{THR1}$ for $t_1$ and $RL_{REC}$ is not greater than $RL_{THR2}$ for $t_2$, the algorithm loops back to step 3700. If $RL_{REC}$ is less than $RL_{THR1}$ for $t_1$ or $RL_{REC}$ is greater than $RL_{THR2}$ for $t_2$, the algorithm issues a notification in step 3704 and ends.

In step 3706, the algorithm calculates $RL_{HRLYAVG}$ and $RL_{DAILYAVG}$ provided that the rack is operating, all sensors are providing valid data and the number of good data points is at least 20% of the total sample of data points. If these conditions are not met, the algorithm sets TD equal to −100 and $RL_{REC}$ equal to −100. In step 3708, $RL_{REC}$, $RL_{HRLYAVG}$, $RL_{DAILYAVG}$, TD and the reset flag date (if a reset was initiated) are logged.

Figure 38:
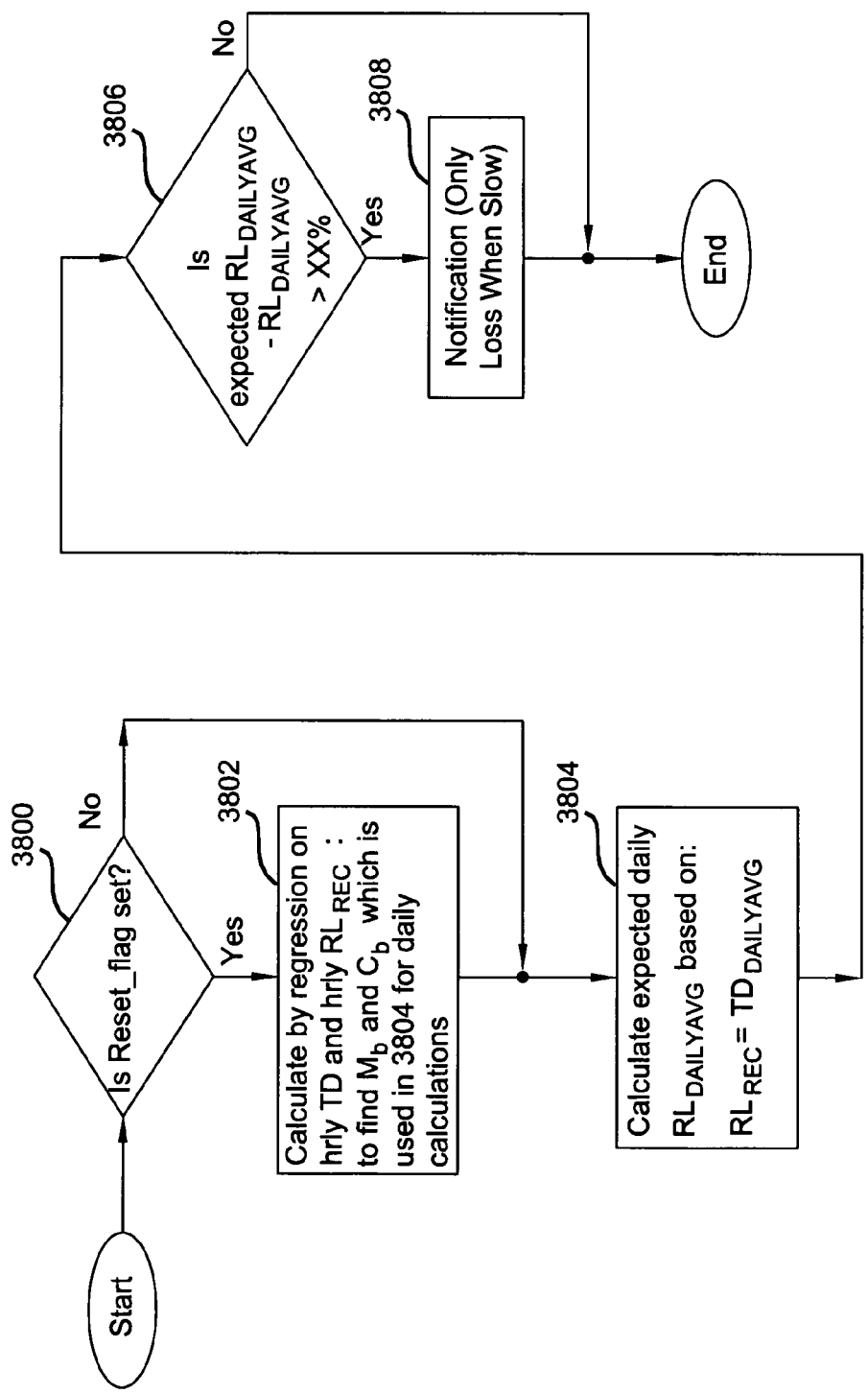
FIG. 38 is a flowchart illustrating further details of the refrigerant charge monitoring algorithm.

Referring now to FIG. 38, the algorithm calculates expected daily RL values. The algorithm determines whether the reset flag has been set in step 3800. If the reset flag has been set, the algorithm continues in step 3802. If the reset flag has not been set, the algorithm continues in step 3804. In step 3802, the algorithm calculates $TD_{HRLY}$ and plots the function $RL_{REC}$ versus TD, according to the function $RL_{REC}=Mb \times TD+Cb$, where Mb is the slope of the line and Cb is the Y-intercept. In step 3804, the algorithm calculates expected $RL_{DAILYAVG}$ based on the function. In step 3806, the algorithm determines whether the expected $RL_{DAILYAVG}$ minus the actual $RL_{DAILYAVG}$ is greater than a threshold percentage. When the difference is not greater than the threshold percentage, the algorithm ends. When the difference is greater than the threshold, a notification is issued in step 3808, and the algorithm ends.

Figure 39:
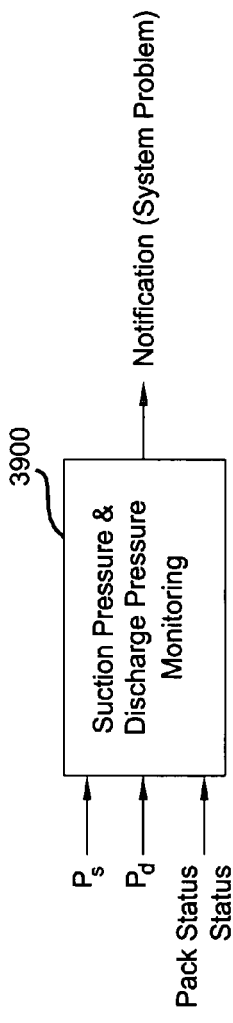
FIG. 39 is a block diagram illustrating inputs and outputs of a suction and discharge pressure monitoring algorithm.

$P_s$ and $P_d$ have significant implications on overall refrigeration system performance. For example, if $P_s$ is lowered by 1 PSI, the compressor power increases by about 2%. Additionally, any drift in $P_s$ and $P_d$ may indicate malfunctioning of sensors or some other system change such as set point change. The suction and discharge pressure monitoring algorithm calculates daily averages of these parameters and archives these values in the server. The algorithm initiates an alarm when there is a significant change in the averages. FIG. 39 illustrates a suction and discharge pressure monitoring block 3900 that receives $P_s$, $P_d$ and a pack status as inputs. The suction and discharge pressure monitoring block 3900 selectively generates a notification based on the inputs.

Figure 40:
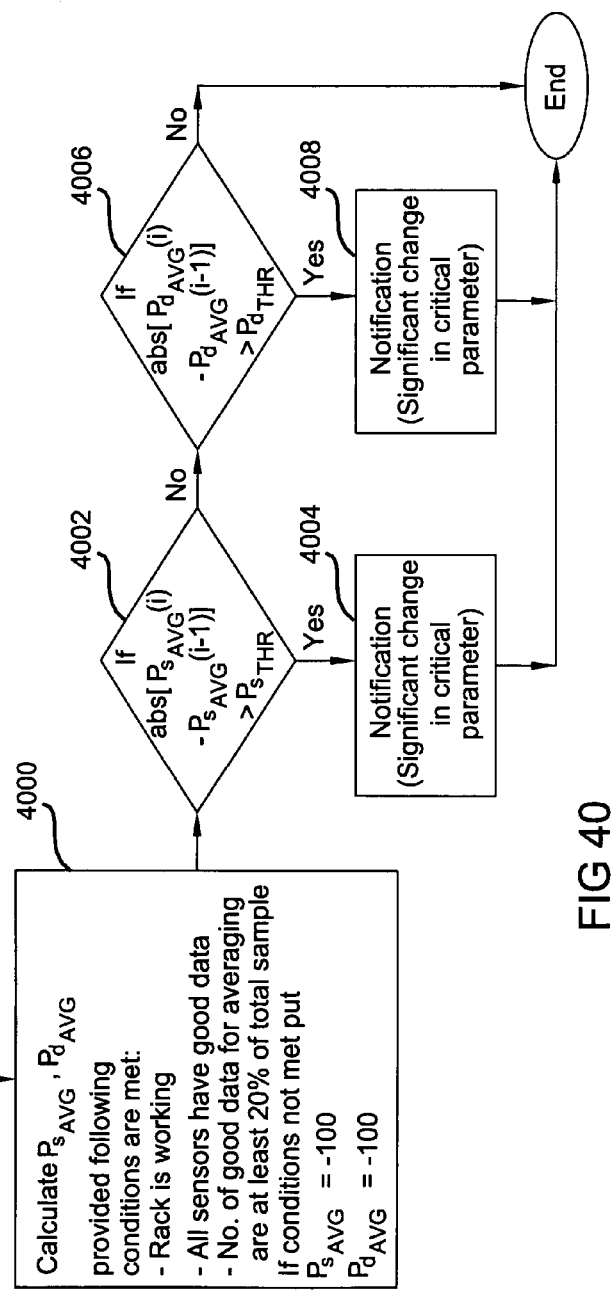
FIG. 40 is a flowchart illustrating the suction and discharge pressure monitoring algorithm.

Referring now to FIG. 40, the suction and discharge pressure monitoring algorithm calculates daily averages of $P_s$ and $P_d$ ($P_{sAVG}$ and $P_{dAVG}$, respectively) in step 4000 provided that the rack is operating, all sensors are generating valid data and the number of good data points is at least 20% of the total number of data points. If these conditions are not met, the algorithm sets $P_{sAVG}$ equal to −100 and $P_{dAVG}$ equal to −100. In step 4002, the algorithm determines whether the absolute value of the difference between a current $P_{sAVG}$ and a previous $P_{sAVG}$ is greater than a suction pressure threshold ($P_{sTHR}$). If the absolute value of the difference between the current $P_{sAVG}$ and the previous $P_{sAVG}$ is greater than $P_{sTHR}$, the algorithm issues a notification in step 4004 and ends. If the absolute value of the difference between the current $P_{sAVG}$ and the previous $P_{sAVG}$ is not greater than $P_{sTHR}$, the algorithm continues in step 4006.

In step 4006, the algorithm determines whether the absolute value of the difference between a current $P_{dAVG}$ and a previous $P_{dAVG}$ is greater than a discharge pressure threshold ($P_{dTHR}$). If the absolute value of the difference between the current $P_{dAVG}$ and the previous $P_{dAVG}$ is greater than $P_{dTHR}$, the algorithm issues a notification in step 4008 and ends. If the absolute value of the difference between the current $P_{dAVG}$ and the previous $P_{dAVG}$ is not greater than $P_{dTHR}$, the algorithm ends. Alternatively, the algorithm may compare $P_{dAVG}$ and $P_{sAVG}$ to predetermined ideal discharge and suction pressures.

The description is merely exemplary in nature and, thus, variations are not to be regarded as a departure from the spirit and scope of the teachings.

What is claimed is:

1. A method comprising:
    sensing refrigerant pressure in a refrigeration system;
    calculating a first refrigerant pressure parameter based on sensing said refrigerant pressure over a first time period;
    calculating a second refrigerant pressure parameter based on sensing said refrigerant pressure over a second time period, said second time period occurring after said first time period;
    calculating a difference between said first refrigerant pressure parameter and said second refrigerant pressure parameter;
    comparing said difference between said first and second refrigerant pressure parameters and a predetermined threshold; and
    determining a system condition based on said comparison.

2. The method of claim 1, wherein said refrigerant pressure is at least one of a suction pressure and a discharge pressure.

3. A controller configured with programming stored in a computer readable medium to execute the method of claim 2.

4. A computer-readable medium having computer-executable instructions for execution by a controller to perform the method of claim 2.

5. The method of claim 1, wherein said system condition includes at least one of a refrigeration system malfunction and a set-point change.

6. The method of claim 5, wherein said refrigerator system malfunction comprises a sensor malfunction.

7. A controller configured with programming stored in a computer readable medium to execute the method of claim 6.

8. A computer-readable medium having computer-executable instructions for execution by a controller to perform the method of claim 6.

9. A controller configured with programming stored in a computer readable medium to execute the method of claim 5.

10. A computer-readable medium having computer-executable instructions for execution by a controller to perform the method of claim 5.

11. The method of claim 1, further comprising generating a notification based on said determining.

12. A controller configured with programming stored in a computer readable medium to execute the method of claim 11.

13. A computer-readable medium having computer-executable instructions for execution by a controller to perform the method of claim 11.

14. A controller configured with programming stored in a computer readable medium to execute the method of claim 1.

15. A computer-readable medium having computer-executable instructions for execution by a controller to perform the method of claim 1.

16. The method of claim 1, wherein said calculating said first refrigerant pressure parameter includes averaging said refrigerant pressure over said first time period and said calculating said second refrigerant pressure parameter includes averaging said refrigerant pressure over said second time period.

17. A controller configured with programming stored in a computer readable medium to execute the method of claim 16.

18. A computer-readable medium having computer-executable instructions for execution by a controller to perform the method of claim 16.

19. The method of claim 1, wherein said first time period is a first day and said second time period is a second day.

20. A controller configured with programming stored in a computer readable medium to execute the method of claim 19.

21. A computer-readable medium having computer-executable instructions for execution by a controller to perform the method of claim 19.

22. The method of claim 1, wherein said second time period is a current day and said first time period is a previous day.

23. The method of claim 1, wherein said comparing includes determining whether an absolute value of said difference is greater than said predetermined threshold.

24. A controller configured with programming stored in a computer readable medium to execute the method of claim 23.

25. A computer-readable medium having computer-executable instructions for execution by a controller to perform the method of claim 23.

26. A method comprising:
sensing suction pressure and discharge pressure in a refrigeration system;
calculating a first suction pressure parameter based on sensing said suction pressure over a first time period;
calculating a second suction pressure parameter based on sensing said suction pressure over a second time period, said second time period occurring after said first time period;
calculating a second discharge pressure parameter based on sensing said discharge pressure over said second time period;
comparing a difference between said first and second suction pressure parameters to a predetermined suction pressure threshold;
issuing a first system notification when said difference between said first and second suction pressure parameters is greater than said predetermined suction pressure threshold; and
when said difference between said first and second suction pressure parameters is less than said predetermined suction pressure threshold, comparing a difference between said first discharge pressure parameter and said second discharge pressure parameter to a predetermined discharge pressure threshold and issuing a second system notification when said difference between said first and second pressure parameters is greater than said predetermined discharge pressure threshold.

27. The method of claim 26 wherein at least one of said first system notification and said second system notification includes a notification of at least one of a refrigeration system malfunction and a set-point change.

28. The method of claim 27, wherein said refrigeration system malfunction comprises a sensor malfunction.

29. A controller configured with programming stored in a computer readable medium to execute the method of claim 27.

30. A computer-readable medium having computer-executable instructions for execution by a controller to perform the method of claim 27.

31. A controller configured with programming stored in a computer readable medium to execute the method of claim 26.

32. A computer-readable medium having computer-executable instructions for execution by a controller to perform the method of claim 26.

* * * * *

UNITED STATES PATENT AND TRADEMARK OFFICE
CERTIFICATE OF CORRECTION

PATENT NO. : 7,752,853 B2
APPLICATION NO. : 11/256637
DATED : July 13, 2010
INVENTOR(S) : Abtar Singh et al.

Page 1 of 2

It is certified that error appears in the above-identified patent and that said Letters Patent is hereby corrected as shown below:

| | |
|---|---|
| Title Page, No. (56) References Cited, Foreign Patent Documents Page 3, Column 2, reference No. 13 | "EP 0 453 301 A1 10/1991" should be --EP 0 453 302 A1 10/1991--. |
| Column 4, Line 41 | "on an off" should be --on and off--. |
| Column 6, Line 50 | "°C./V" should be --°C/V--. |
| Column 9, Line 33 | "($1_{CND}$)" should be --($I_{CND}$)--. |
| Column 9, Line 34 | "($1_{EACHFAN}$)" should be --($I_{EACHFAN}$)--. |
| Column 9, Line 34-35 | "($\delta 1_{FANCURRENT}$)" should be --($\delta I_{FANCURRENT}$)--. |
| Column 9, Line 43 | "$1_{CND}$" should be --$I_{CND}$--. |
| Column 9, Line 44 | "$1_{EACHFAN}$ and $\delta 1_{FANCURRENT}$" should be --$I_{EACHFAN}$ and $\delta I_{FANCURRENT}$--. |
| Column 9, Line 53 | "$1_{CND}$" should be --$I_{CND}$--. |
| Column 9, Line 54 | "$1_{EACHFAN}$ and $\delta 1_{FANCURRENT}$" should be --$I_{EACHFAN}$ and $\delta I_{FANCURRENT}$--. |
| Column 9, Line 58 | After "calculates", "and" should be --an--. |
| Column 9, Line 59 | "($1_{EXP}$)" should be --($I_{EXP}$)--. |

Signed and Sealed this
Sixteenth Day of August, 2011

David J. Kappos
*Director of the United States Patent and Trademark Office*

CERTIFICATE OF CORRECTION (continued)
U.S. Pat. No. 7,752,853 B2

| | |
|---|---|
| Column 9, Line 64 | "$1_{CND}$" should be --$I_{CND}$--. |
| Column 9, Line 65 | "$1_{EXP}$ and $\delta 1_{FANCURRENT}$" should be --$I_{EXP}$ and $\delta I_{FANCURRENT}$--. |
| Column 10, Line 12 | "$1_{CND}, 1_{CMP},$" should be --$I_{CND}, I_{CMP},$--. |
| Column 10, Line 31 | "$1_{onefan}$" should be --$I_{onefan}$--. |
| Column 10, Line 32 | "$1_{CND}$" should be --$I_{CND}$--. |
| Column 10, Line 33 | "$1_{onefan}$" should be --$I_{onefan}$--. |
| Column 10, Line 33 | After "fan.", delete "The". |
| Column 10, Line 35 | "$1_{CMP}$ and $1_{CND}$" should be --$I_{CMP}$ and $I_{CND}$--. |
| Column 11, Line 21 | "then" should be --than--. |
| Column 11, Line 22 | "then" should be --than--. |
| Column 11, Line 38 | "Ts" should be --$T_S$--. |
| Column 12, Line 7 | "beak-down" should be --break-down--. |
| Column 13, Line 17 | Both occurrences of "$t_{THRSH}$" should be --$t_{THRESH}$--. |
| Column 13, Line 19 | "$t_{THRSH}$" should be --$t_{THRESH}$--. |
| Column 13, Line 40 | "increases" should be --increasing--. |
| Column 13, Lines 57-58 | "predicated" should be --predicted--. |
| Column 14, Line 29 | "if" should be --If--. |
| Column 14, Line 48 | "not" should be --now--. |
| Column 15, Line 15 | After "receiver", insert --it--. |